United States Patent [19]
Krech, Jr.

[11] Patent Number: 5,784,075
[45] Date of Patent: *Jul. 21, 1998

[54] MEMORY MAPPING TECHNIQUES FOR ENHANCING PERFORMANCE OF COMPUTER GRAPHICS SYSTEM

[75] Inventor: Alan S. Krech, Jr., Fort Collins, Colo.

[73] Assignee: Hewlett-Packard Company, Palo Alto, Calif.

[*] Notice: The term of this patent shall not extend beyond the expiration date of Pat. No. 5,784,075.

[21] Appl. No.: 512,430

[22] Filed: Aug. 8, 1995

[51] Int. Cl.$^6$ .................................................. G06F 12/06
[52] U.S. Cl. .................................... 345/516; 345/501
[58] Field of Search .......................... 395/511, 507, 395/516, 501, 526, 515, 505; 345/95, 123, 501, 503, 515, 516, 505, 523, 526

[56] References Cited

U.S. PATENT DOCUMENTS

| | | | |
|---|---|---|---|
| 3,653,001 | 3/1972 | Ninke | 395/132 |
| 4,538,183 | 8/1985 | Kano et al. | 358/280 |
| 5,348,579 | 9/1994 | Nakasuji et al. | 345/123 |
| 5,367,632 | 11/1994 | Bowen et al. | 395/509 |
| 5,371,840 | 12/1994 | Fischer et al. | 395/133 |
| 5,408,605 | 4/1995 | Deering | 395/515 |
| 5,481,651 | 1/1996 | Herold | 345/94 |
| 5,543,824 | 8/1996 | Priem et al. | 345/201 |

Primary Examiner—Raymond J. Bayerl
Assistant Examiner—Cao H. Nguyen

[57] ABSTRACT

A geometry accelerator for a computer graphics system performs transformations on vertex data representative of graphics primitives, decomposes quadrilaterals into triangles, and performs lighting, clipping and plane equation calculations for each primitive. The geometry accelerator incorporates a memory mapping technique that achieves high efficiency transfer of vertex information from the host computer to the geometry accelerator. A double buffered vertex RAM with granularity permits the quantity of data transferred to the geometry accelerator to be reduced. The transformation and decomposition engines of the geometry accelerator employ data management techniques in which calculations for shared vertices and shared edges of primitives are performed only once.

17 Claims, 34 Drawing Sheets

| TRIANGLE NO. | VERTEX NO. | PARAMETER | VERTEX RAM LOCATION |
|---|---|---|---|
| TRIANGLE 1 | VERTEX 0 | X | BUFFER 0 |
| | | Y | BUFFER 0 |
| | | Z = 5 | BUFFER 0 |
| | | RED = 1 | BUFFER 0 |
| | | GREEN = 0 | BUFFER 0 |
| | | BLUE = 0 | BUFFER 0 |
| | VERTEX 1 | X | BUFFER 0 |
| | | Y | BUFFER 0 |
| | | Z = 10 | BUFFER 0 |
| | | RED = 0 | BUFFER 0 |
| | | GREEN = 1 | BUFFER 0 |
| | | BLUE = 0 | BUFFER 0 |
| | VERTEX 2 | X | BUFFER 0 |
| | | Y | BUFFER 0 |
| | | Z = 10 | BUFFER 0 |
| | | RED = 0 | BUFFER 0 |
| | | GREEN = 0 | BUFFER 0 |
| | | BLUE = 1 | BUFFER 0 |
| TRIANGLE 2 | VERTEX 0 | X | BUFFER 1 |
| | | Y | BUFFER 1 |
| | | Z = 10 | BUFFER 1 |
| | | RED = 1 | BUFFER 1 |
| | | GREEN = 1 | BUFFER 1 |
| | | BLUE = 1 | BUFFER 1 |

Fig. 10A

| | | | |
|---|---|---|---|
| TRIANGLE 2 | VERTEX 1 | X | BUFFER 1 |
| | | Y | BUFFER 1 |
| | | RED = 1 | BUFFER 1 |
| | | GREEN = 1 | BUFFER 1 |
| | | BLUE = 0 | BUFFER 1 |
| | VERTEX 2 | X | BUFFER 1 |
| | | Y | BUFFER 1 |
| | | RED = 1 | BUFFER 1 |
| | | GREEN = 0 | BUFFER 1 |
| | | BLUE = 1 | BUFFER 1 |
| TRIANGLE 3 | VERTEX 0 | X | BUFFER 0 |
| | | Y | BUFFER 0 |
| | VERTEX 1 | X | BUFFER 0 |
| | | Y | BUFFER 0 |
| | | RED = 1 | BUFFER 0 |
| | | GREEN = 1 | BUFFER 0 |
| | | BLUE = 1 | BUFFER 0 |
| | VERTEX 2 | X | BUFFER 0 |
| | | Y | BUFFER 0 |
| | | RED = 1 | BUFFER 0 |
| | | GREEN = 1 | BUFFER 0 |
| | | BLUE = 1 | BUFFER 0 |
| TRIANGLE 4 | VERTEX 0 | X | BUFFER 1 |
| | | Y | BUFFER 1 |
| | VERTEX 1 | X | BUFFER 1 |
| | | Y | BUFFER 1 |
| | VERTEX 2 | X | BUFFER 1 |
| | | Y | BUFFER 1 |

Fig. 10B

| LEFT SIDE | REGISTER NUMBER | RIGHT SIDE |
|---|---|---|
| XT0 | 4 | matrix A0 |
| XT1 | 5 | matrix A1 |
| YT0 | 6 | matrix A2 |
| YT1 | 7 | matrix A3 |
| ZT0 | 8 | matrix B0 |
| ZT1 | 9 | matrix B1 |
| WT0 | 10 | matrix B2 |
| WT1 | 11 | matrix B3 |
| RT0 | 12 | matrix C0 |
| RT1 | 13 | matrix C1 |
| GT0 | 14 | matrix C2 |
| GT1 | 15 | matrix C3 |
| BT0 | 16 | matrix D0 |
| BT1 | 17 | matrix D1 |
| DY3 | 18 | matrix D2 |
| DX3 | 19 | matrix D3 |
| clip limit Zmin | 20 | X0 |
| clip limit Zmax | 21 | Y0 |
| clip limit Xmin | 22 | W0 |
| clip limit Xmax | 23 | X1 |
| clip limit Ymin | 24 | Y1 |
| clip limit Ymax | 25 | W1 |
| DY1 | 26 | DY2 |
| DX1 | 27 | DX2 |
| DXY1 | 28 | temp0 |
| DXY0 | 29 | temp1 |
| DY0 | 30 | DXY1' |
| DX1 | 31 | DXY0' |

FIG. 12

| OFFSET | SYMBOL | DESCRIPTION |
|---|---|---|
| 0x0 | X | X - Coordinate |
| 0x1 | Y | Y - Coordinate |
| 0x2 | Z | Z - Coordinate |
| 0x3 | W | Evil Perspective Thing |
| 0x4 | A | Alpha |
| 0x5 | R | Red |
| 0x6 | G | Green |
| 0x7 | B | Blue |
| 0x8 | NX | X - Normal |
| 0x9 | NY | Y - Normal |
| 0xA | NZ | Z - Normal |
| 0xB | S | Texture S - Coordinate |
| 0xC | T | Texture T - Coordinate |
| 0xD | DXY | Space for DX[4] or DY[4] |
| 0xE | DX | Edge delta X |
| 0xF | DY | Edge delta Y |

FIG. 13

MEMORY MAPPING TECHNIQUES FOR ENHANCING PERFORMANCE OF COMPUTER GRAPHICS SYSTEM

FIELD OF THE INVENTION

This invention relates to geometry accelerators in computer graphics systems and, more particularly, to geometry accelerators that utilize memory mapping and organization techniques and data management techniques which enhance performance.

BACKGROUND OF THE INVENTION

Computer graphics systems are commonly used for displaying graphical representations of objects on a two-dimensional video display screen. Current computer graphics systems provide highly detailed representations and are used in a variety of applications.

In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

Typically, the primitives of the three-dimensional object to be rendered are defined by a host computer in terms of primitive data. For example, when the primitive is a triangle, the host computer may define the primitive in terms of the X, Y and Z coordinates of its vertices, as well as the red, green and blue (R, G and B) color values of each vertex. Additional primitive data may be used in specific applications. Rendering hardware interpolates the primitive data to compute the display screen pixels that represent each primitive, and the R, G and B color values for each pixel.

The basic components of a computer graphics system may include a geometry engine, or geometry accelerator, a rasterizer and a frame buffer. The system may also include texture mapping hardware. The geometry accelerator receives from the host computer primitive data which defines the primitives that make up the view to be displayed. The geometry accelerator performs transformations on the primitive data, decomposes quadrilaterals into triangles, and performs lighting, clipping and plane equation calculations for each primitive. The output of the geometry accelerator is rendering data used by the rasterizer and the texture mapping hardware to generate final coordinate and color data for each pixel in each primitive. The pixel data from the rasterizer and the pixel data from the texture mapping hardware, if available, are combined and stored in the frame buffer for display on the video display screen.

The operations of the geometry accelerator are highly computation intensive. One frame of a 3-D graphics display may include on the order of hundreds of thousands of primitives. To achieve state of the art performance, the geometry accelerator may be required to perform on the order of 264 million floating point calculations per second per chip. Furthermore, the volume of data transferred between the host computer and the graphics hardware is very large. The data for a single quadrilateral may be on the order of 64 words of 32 bits each. Additional data transmitted from the host computer to the geometry accelerator includes lighting parameters, clipping parameters and any other parameters needed to generate the graphics display.

Various techniques have been employed to improve the performance of geometry accelerators, including pipelining and multiprocessing. Nonetheless, the need exists for additional improvements in performance. In particular, the need exists for reducing overhead on the host computer, reducing the quantity of data that must be transferred from the host computer to the geometry accelerator, and increasing the efficiency of data handling and computations by the geometry accelerator.

SUMMARY OF THE INVENTION

According to a first aspect of the invention, apparatus for transfer of vertex information representative of graphics primitives between a host computer and processing circuitry in a computer graphics system is provided. The apparatus comprises a storage device for receiving the vertex information from the host computer, the vertex information including vertex data and a vertex address corresponding to the vertex data. The vertex address specifies a characteristic of the corresponding vertex data. The apparatus further comprises a vertex RAM for storage of the vertex data for access by the processing circuitry, address mapping logic for mapping the vertex address to a write address in the vertex RAM in accordance with the characteristics specified by the vertex address, and means for transferring the vertex data from the storage device to a location in the vertex RAM specified by the write address.

The vertex RAM may comprise a first buffer and a second buffer. The vertex address may specify a vector draw vertex address indicative of a new vertex of a polyline primitive. The address mapping logic preferably includes means for mapping successive vector draw vertex addresses in alternating first and second locations in the vertex RAM. The vertex address may also specify a vector strip vertex address indicative of a new vertex of a triangle strip. The address mapping logic preferably includes means for mapping successive vector strip vertex addresses in sequence to first, second and third vertex locations in the vertex RAM. The vertex address may specify a trigger primitive command. The apparatus preferably includes means responsive to the trigger primitive command for notifying the processing circuitry to begin processing the vertex data. The vertex address may specify a double word write. The address mapping logic preferably includes means responsive to the double word write for mapping successive data words following the double word write to successive locations of the vertex RAM.

According to another aspect of the invention, a method for transfer of vertex information representative of graphics primitives between a host computer and graphics hardware comprising processing circuitry, a storage device and a vertex RAM is provided. The method comprises the steps of transferring the vertex information from the host computer to the storage device, the vertex information including vertex data and a vertex address corresponding to the vertex data, wherein the vertex address specifies a characteristic of the corresponding vertex data, mapping the vertex address to a write address in the vertex RAM in accordance with the characteristic specified by the vertex address, and transferring the vertex data from the storage device to a location in the vertex RAM specified by the write address.

BRIEF DESCRIPTION OF THE DRAWINGS

For a better understanding of the present invention, reference is made to the accompanying drawings, which are incorporated herein by reference and in which:

FIGS. 10-A and 10-B illustrate the vertex parameters sent to the double buffered vertex RAM with granularity;

FIG. 12 illustrates the organization of the register file in the left stack processing circuitry;

FIG. 13 illustrates the organization of the primitive RAM buffer in the geometry accelerator;

DETAILED DESCRIPTION

Figure 1:
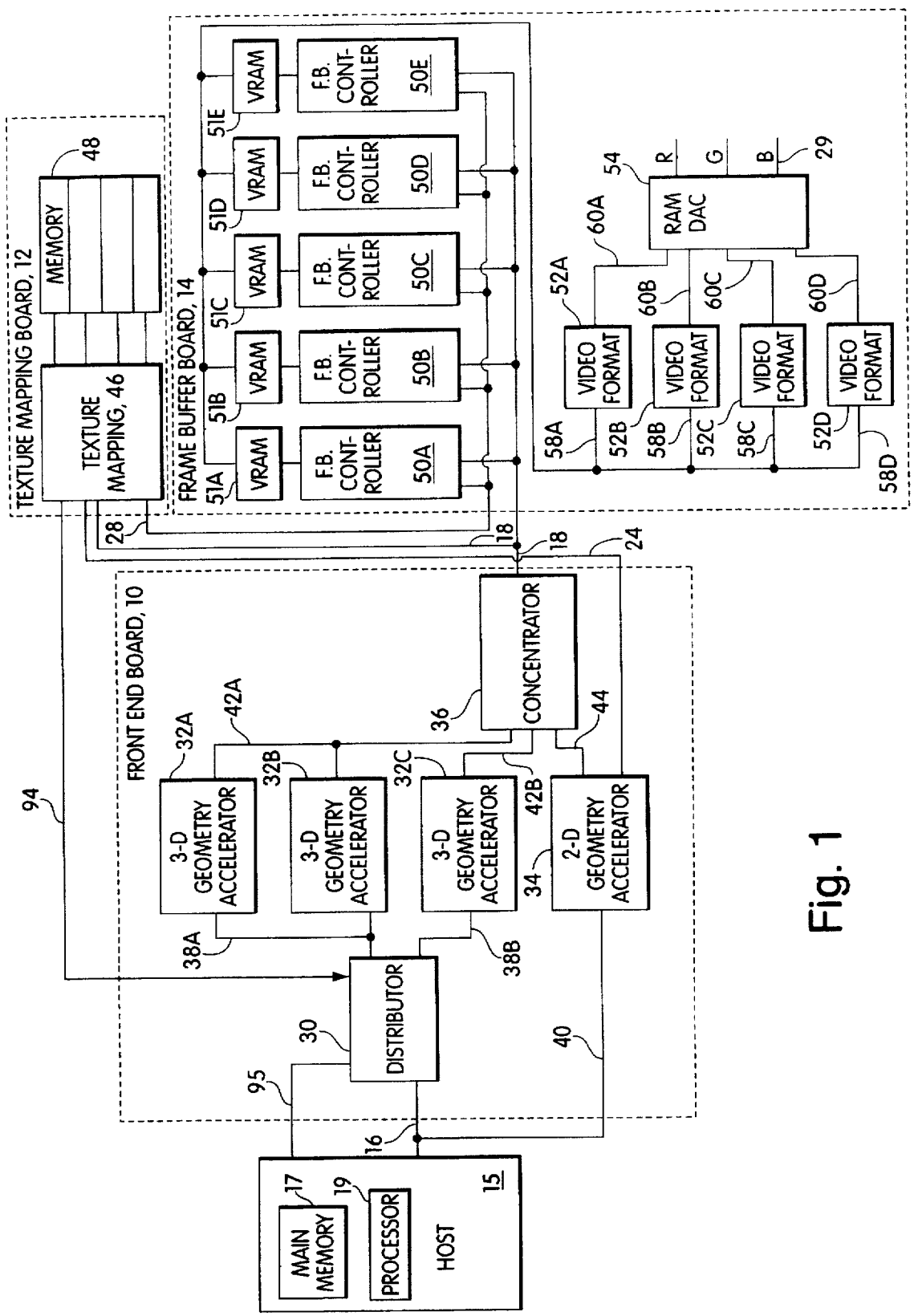
FIG. 1 is a block diagram of a first embodiment of a computer graphics system incorporating the present invention.

FIG. 1 is a block diagram of a first embodiment of a computer graphics system suitable for incorporation of the present invention. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12, and a frame buffer board 14.

The front end board communicates with a host computer 15 over a 52-bit bus 16. The front end board receives primitives to be rendered from the host computer over bus 16. The primitives are specified by X,Y,Z coordinate data, R,G and B color data, alpha, normals and texture S,T coordinates for portions of the primitives, such as for the vertices when the primitive is a triangle.

Data representing the primitives in three dimensions then is provided by the front end board 10 to the texture mapping board 12 and the frame buffer board 14 over 64-bit bus 18. The texture mapping board interpolates the primitive data received to compute the screen display pixels that will represent the primitive, and determines corresponding resultant texture data for each primitive pixel. The resultant texture data is provided to the frame buffer board over five 11-bit buses 28, which are shown in FIG. 1 as a single bus for clarity of illustration.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is preferably pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 may include a distributor chip 30, three three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the X,Y,Z coordinates that define the primitives received into corresponding screen space coordinates, determines object R,G,B values and texture S,T values for the screen space coordinates, decomposes quadrilaterals into triangles, calculates partial slope information, and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Relevant operations performed by each 3-D geometry accelerator chip are described in more detail below. Output data from the 3-D geometry accelerator chips 32A, 32B and 32C respectively is provided over 44-bit buses 42A and 42B to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the cache memory is formed from a plurality of SDRAM (synchronous dynamic random access memory) chips. The cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include lines and triangles. The texture mapping board does not perform texture mapping of points or lines, and operates only upon triangle primitives. The data representing the triangle primitives includes the X,Y,Z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the X,Y pixel coordinates to calculate S and T coordinates that correspond to each X,Y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A, 50B, 50C, 50D and 50E are respectively coupled to groups of associated VRAM (video random access memory) chips 51A–E. The frame buffer board may further include four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen. A blending mode defining the manner in which the object and texture color values are combined is controlled by a rendering mode control word that is provided over bus 28.

The resulting image video data generated by the frame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 27 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

Figure 2:
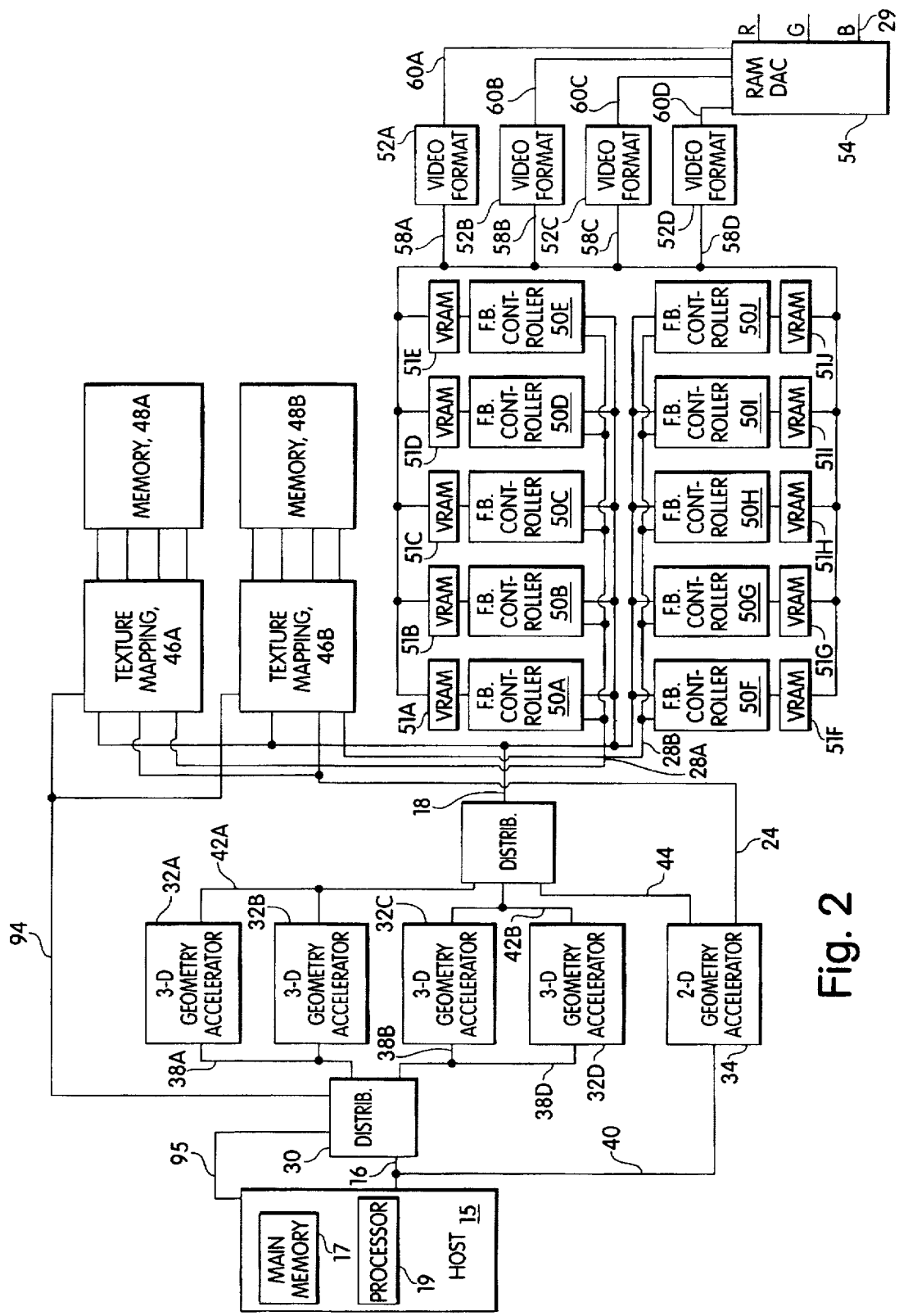
FIG. 2 is a block diagram of a second embodiment of a computer graphics system incorporating the present invention.

In one embodiment of the invention, hardware on the texture mapping board 12 and the frame buffer board 14 is replicated so that certain primitive rendering tasks can be performed on multiple primitives in parallel, thereby increasing the bandwidth of the system. An example of such an alternate embodiment of the present invention is shown in FIG. 2, which is a block diagram of a computer graphics system of the present invention having certain hardware replicated. The system of FIG. 2 includes four 3-D geometry accelerator chips 32A, 32B, 32C and 32D, two texture mapping chips 46A and 46B respectively associated with cache memories 48A and 48B, and ten frame buffer chips 50A–50J, each with an associated group of VRAM chips. The operation of the system of FIG. 2 is similar to that of the system of FIG. 1, described above. The replication of the hardware in the embodiment of FIG. 2 allows for increased system bandwidth because certain primitive rendering operations can be performed in parallel on multiple primitives.

Figure 3:
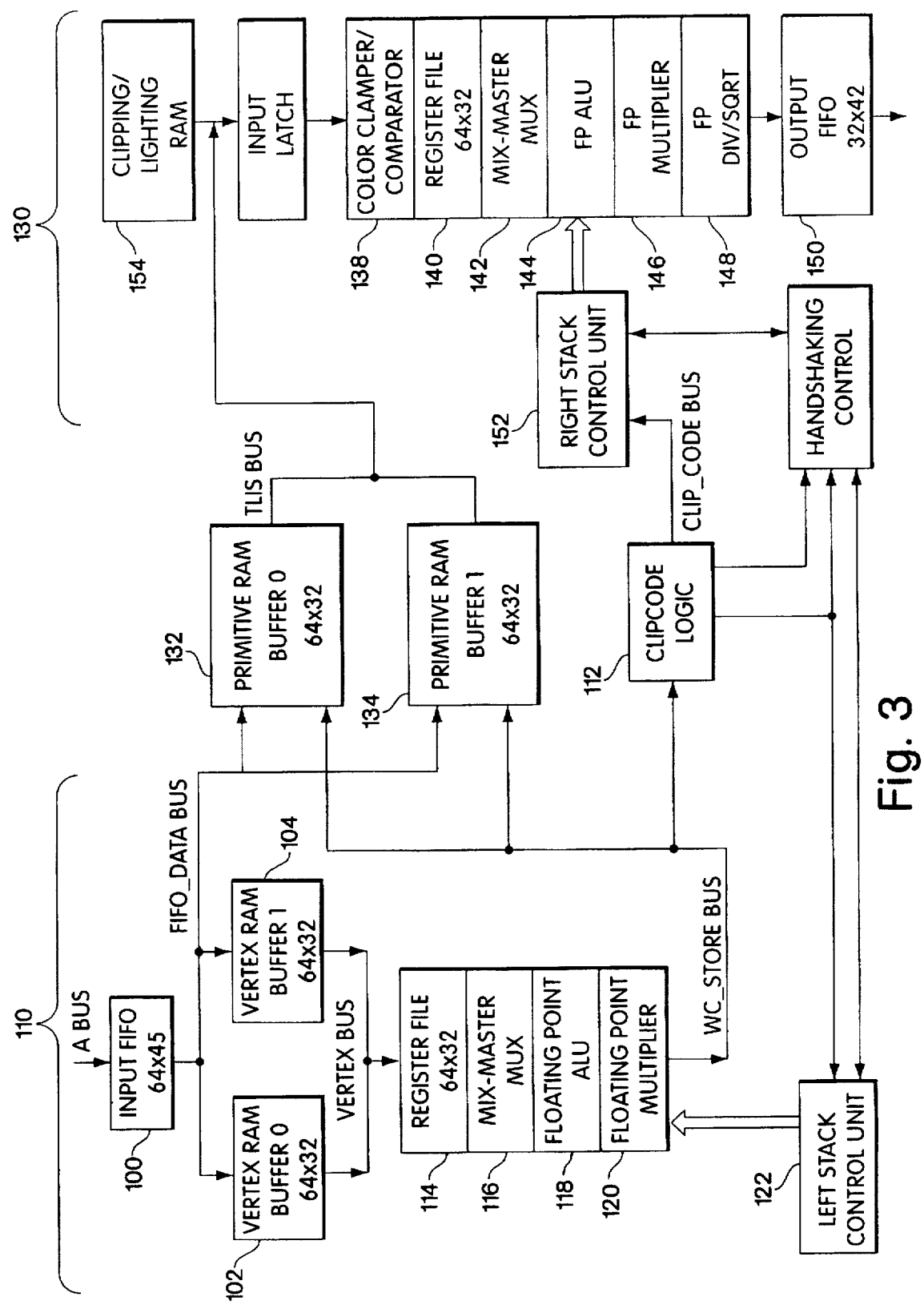
FIG. 3 is a block diagram of a geometry accelerator chip incorporating the present invention.

A simplified block diagram representative of geometry accelerator chips 32A, 32B and 32C is shown in FIG. 3. Primitive data from host computer 15 is supplied through an input FIFO 100 to a double-buffered vertex RAM which includes vertex RAM (buffer 0) 102 and vertex RAM (buffer 1) 104. The geometry accelerator includes two separate processors in a pipeline configuration. A left stack 110 includes clip code logic 112, a register file 114, a multiplexer 116, a floating point ALU 118 and a floating point multiplier 120. Operations of the left stack 110 are controlled by a left stack control unit 122, which includes address decode logic, a transformation engine and a decomposition engine. Results from the left stack 110 are supplied to a right stack 130 through a double-buffered primitive RAM, including a primitive RAM (buffer 0) 132 and a primitive RAM (buffer 1) 134. The right stack includes a color clamper/comparator 138, a register file 140, a multiplexer 142, a floating point ALU 144, a floating point multiplier 146, and a floating point divide/square root unit 148. Results from the right stack 130 are supplied through an output FIFO 150 to the texture mapping board 12 and the frame buffer board 14 (FIG. 1). Operations of the right stack 130 are controlled by a right stack control unit 152, which includes lighting, clipping and plane equation engines. Clipping and lighting parameters are supplied by the host computer 15 to a clipping/lighting RAM 154. A handshaking control unit 156 is coupled between the left stack control unit 122, the right stack control unit 152 and the clip code logic 112. The handshaking control unit 156 controls communication between the left stack 110 and the right stack 130, and facilitates the two stacks working together.

The geometry accelerator performs transformations, decomposition of quadrilaterals, partial slope calculations for triangles and vectors, lighting (or shading), clipping, and plane equation (or slope) calculations of randomly oriented and defined quadrilaterals (quads), triangles and vectors. The outputs are supplied to the scan converters in the frame buffer board 14 for rendering into pixel data and to texture mapping board 12 for generation of per pixel texture color values.

In the example of FIG. 3, only the right stack 130 contains a divider, in order to limit size and cost. Because the right stack contains a divider and the left stack does not, the partitioning of functionality of the geometry accelerator is for the left stack to perform transformations, partial slope calculations, clip checking, decomposition and some pre-calculations for lighting. The right stack performs lighting, clipping and plane equation calculations. The basic flow of operations is for primitive data to be entered in the input FIFO 100 from the host computer. The primitive data is put into one of the vertex RAM buffers 102 and 104. The left stack 110 then performs transformations, decomposition, and partial slope calculations and places the results in one of the primitive RAM buffers 132 and 134. When the left stack has completed its operations for a primitive, it notifies the right stack 130 to begin operations on the primitive. The left stack can then start working on the next primitive. At the same time, the right stack performs lighting, clipping (if required), and plane equation calculations on the primitive that is in the primitive RAM buffer.

In an alternative embodiment, both the left and right stacks contain identical hardware, including dividers. In this configuration, functionality may be partitioned such that each stack performs the same operations on different primitives.

Table 1 below illustrates the flow of data between the left and right stacks and where the various information is located. Note that the primitive data alternates between vertex RAM buffers 102 and 104 on a primitive-by-primitive basis. Also note that the passthrough information (PT), information which is destined for hardware downstream of the geometry accelerator, is not put into the vertex RAM but flows directly from the input FIFO 100 to the active primitive RAM between the stacks. The right stack 130 operates one primitive behind the left stack, but both stacks are in operation simultaneously, thus providing modified parallel processing-pipelining. Partially completed primitive data is alternated between the primitive RAM buffers 132 and 134. Using these RAMs, passthrough data does not utilize the RAM as random access storage locations, but is treated as a FIFO to improve performance. In this case, the left stack is writing passthrough address and data information into primitive RAM buffer 1, while the right stack 130 is taking data out. In this manner, the geometry accelerator can quickly process large quantities of passthrough information.

TABLE 1

| | Vertex RAM | | Primitive RAM | | |
|---|---|---|---|---|---|
| Left Stack | Buffer 0 | Buffer 1 | Buffer 0 | Buffer 1 | Right Stack |
| Triangle 0 | Triangle 0 | nothing | nothing | nothing | nothing |
| Triangle 1 | Triangle 0 | Triangle 1 | Triangle 0 | nothing | Triangle 0 |
| Triangle 2 | Triangle 2 | Triangle 1 | Triangle 0 | Triangle 1 | Triangle 1 |
| PT 0 | Triangle 2 | Triangle 1 | Triangle 2 | Triangle 1 | Triangle 2 |
| PT 1 | Triangle 2 | Triangle 1 | Triangle 2 | PT 0 | PT 0 |
| PT 2 | Triangle 2 | Triangle 1 | Triangle 2 | PT 1 | PT 1 |
| Triangle 3 | Triangle 2 | Triangle 3 | Triangle 2 | PT 2 | PT 2 |
| Triangle 4 | Triangle 4 | Triangle 3 | Triangle 3 | PT 2 | Triangle 3 |
| nothing | Triangle 4 | Triangle 3 | Triangle 3 | Triangle 4 | Triangle 4 |

The transfer of primitive data from the host computer to the geometry accelerator involves the transfer of large quantities of data. The primitive data includes data for each vertex of the primitive. The data for each vertex of the primitive, such as a line, triangle or quadrilateral, typically includes X, Y and Z coordinates, normal coordinates, NX, NY and NZ, color values R, G and B and alpha, and texture mapping values S and T. The vertex data is typically transmitted as an address and a corresponding data word that specifies the value of one parameter, such as the X coordinate. In order to improve the performance of the graphics system, it is desirable to make the transfer and processing of primitive data as efficient as possible. In particular, by reducing the requirement for data transfer between the host computer and the geometry accelerator, or by reducing the requirement for computations by the host computer, performance is enhanced. For primitives that are not connected to each other, at least some data must be sent for each vertex. As described below, techniques are provided in the geometry accelerator to permit sending common parameters only once. However, certain primitive types permit an increase in the efficiency of data transfer and processing.

Figure 4:
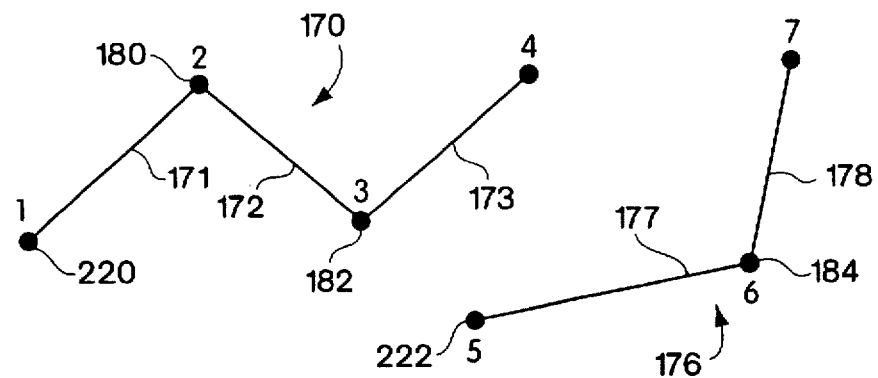
FIG. 4 illustrates polylines that may be processed by the geometry accelerator.

A polyline is a series of interconnected line segments. As shown in FIG. 4, a polyline 170 includes connected vectors 171, 172 and 173. Similarly, a polyline 176 includes connected vectors 177 and 178. It can be seen that vertex 180 is common to vectors 171 and 172 and that vertex 182 is common to vectors 172 and 173. Similarly, vertex 184 is common to vectors 177 and 178.

Figure 5:
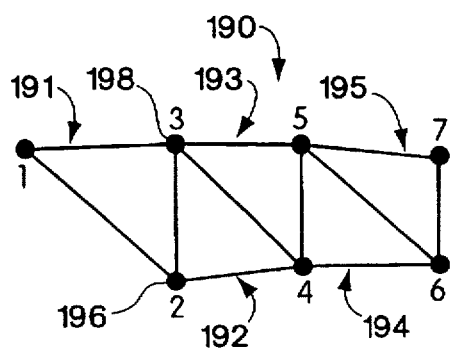
FIG. 5 illustrates a triangle strip that may be processed by the geometry accelerator.

A triangle strip is a series of interconnected triangles. As shown in FIG. 5, a triangle strip 190 includes triangles 191, 192, 193, 194 and 195. Two vertices and one edge are shared between adjacent triangles in the triangle strip. For example, vertex 196 is common to triangles 191 and 192, and vertex 198 is common to triangles 191, 192 and 193.

The geometry accelerator performs calculations on each primitive received from the host computer. In the case of polylines, calculations are performed for each segment, or vector, in the polyline, such as vectors 171, 172 and 173 in polyline 170. In triangle strips, calculations are performed on each individual triangle in the triangle strip. Thus, calculations are performed for triangles 191, 192, 193, 194 and 195 in triangle strip 190. Many of the calculations are performed on a per vertex basis. For shared vertices, such as vertices 180 and 182 and polyline 170, it would be inefficient to transfer the vertex data from the host computer to the geometry accelerator twice, once for each vector shared by the vertex.

Figure 6:
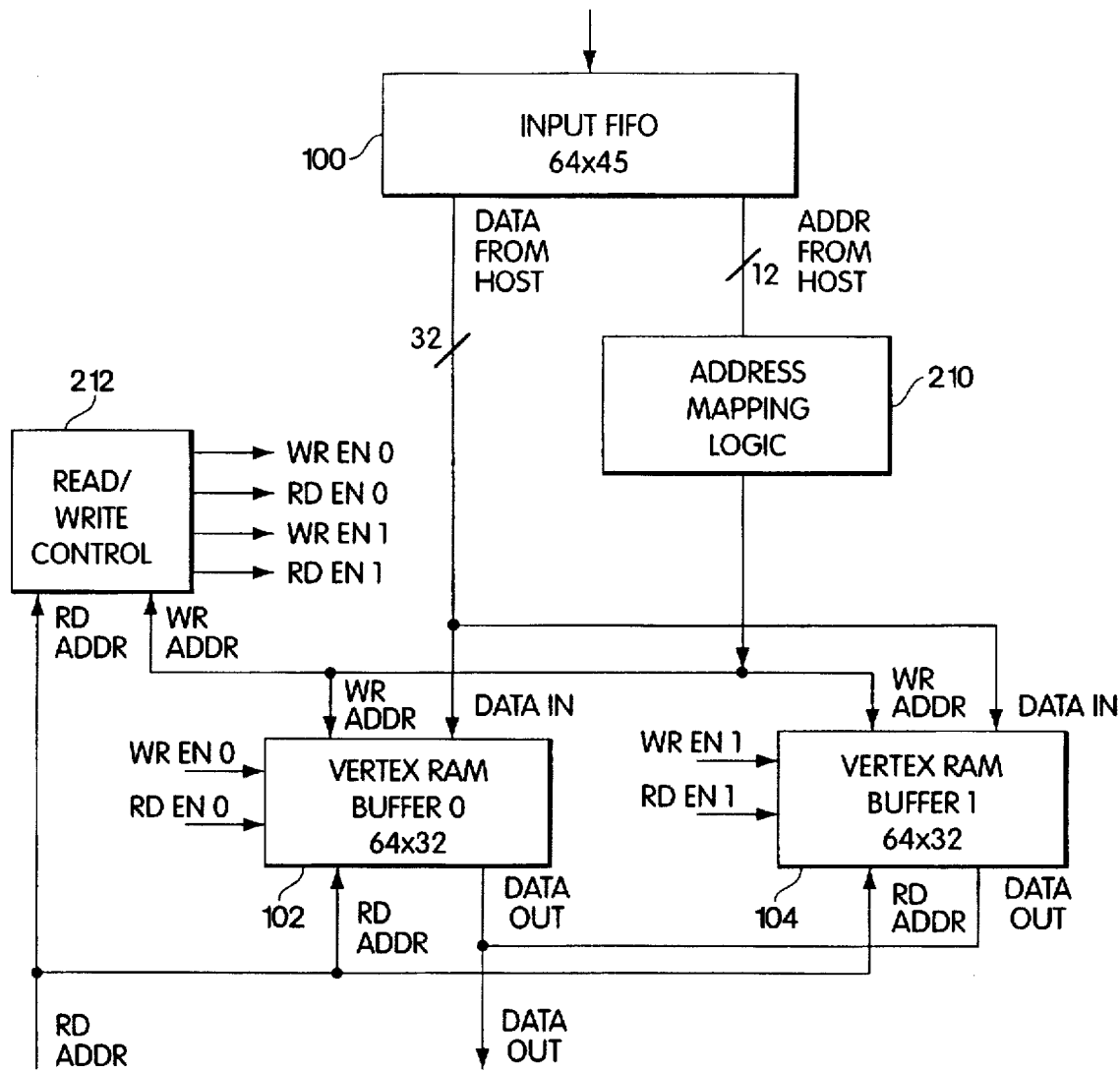
FIG. 6 is a more detailed block diagram of the vertex RAM and associated circuitry shown in FIG. 3.

According to one aspect of the present invention, the geometry accelerator includes a memory mapping technique which permits high efficiency transfer of primitive data from the host computer. Referring to FIG. 6, the vertex RAM is organized as two buffers 102 and 104, each having the capacity to hold vertex parameters for one primitive. Since primitives may include vectors, triangles and quads, each vertex RAM buffer may hold vertex data for up to four vertices ($V_0$, $V_1$, $V_2$ and $V_3$). In a preferred embodiment, each vertex RAM buffer is organized as 64 words of 32 bits, with 16 words assigned to each vertex. The input FIFO 100 receives vertex information, including both the address and the data, from the host computer. In a preferred embodiment, the input FIFO is organized as 64 words of 45 bits. The data bits are supplied by the input FIFO 100 to the vertex RAM buffers 102 and 104. Address bits are supplied by the input FIFO 100 to address mapping logic 210. A read/write control 212 controls writing to and reading from for vertex RAM buffers 102 and 104 as described below.

For each vertex data word received from the host computer, the address mapping logic 210 determines the appropriate location in the vertex RAM. The registers utilized by the host computer and the address mapping logic 210 provide a number of advantageous features in operation of the geometry accelerator. As indicated above, the host computer supplies primitive data on a per vertex basis. A preferred software register set for transfer of primitive data from the host computer to the geometry accelerator is shown in Table 2 below.

Table 2
Host Computer Software Registers
$V_0$ and VM, single word write
$V_1$, single word write
$V_2$, single word write
$V_3$, single word write
$V_0$, single word write, trigger triangle
$V_1$, single word write, trigger triangle
$V_2$, single word write, trigger triangle
$V_0$, single word write, trigger quad
$V_1$, single word write, trigger quad
$V_2$, single word write, trigger quad
$V_3$, single word write, trigger quad
$V_0$ and VM, double word write
$V_1$, double word write
$V_2$, double word write
$V_3$, double word write
$V_0$, double word write trigger triangle
$V_1$, double word write, trigger triangle
$V_2$, double word write, trigger triangle
$V_0$, double word write, trigger quad
$V_1$, double word write, trigger quad
$V_2$, double word write, trigger quad
$V_3$, double word write, trigger quad
VS, single word write
VS, single word write, trigger triangle
VD, single word write
VD, single word write, trigger vector
VS, double word write
VS, double word write, trigger triangle
VD, double word write
VD, double word write, trigger vector
produce triangle
produce quad
produce vector The host computer writes vertex information to one of the registers shown in Table 2. The address mapping logic 210 receives the address portion of the vertex information and generates an address for writing the vertex data in the vertex RAM. Vertex data received from the host computer typically includes X, Y and Z coordinates, normal coordinates (NX, NY and NZ), color values (R,G,B and alpha) and texture mapping values (S and T). In one example, the data for each vertex is contained in twelve 32-bit words. Thus, the register address for each vertex number or vertex type ($V_0$, $V_1$, $V_2$, $V_3$, VM, VS and VD) shown in Table 2 includes a pointer to a particular parameter. As noted above, each of the vertex RAM buffers 102 and 104 has locations for vertex data for four vertices ($V_0$, $V_1$, $V_2$, $V_3$). Primitive data for unconnective primitives is mapped to corresponding vertex locations in the vertex RAM buffer that was least recently written. The vertex RAM may include additional locations for storing information, such as lighting information, that is not part of the vertex data.

The register set shown in Table 2 provides a number of features which enhance the performance of the graphics system. The register locations are written to by the host computer.

For a stream of unconnected primitives, operation is as follows. Assuming that the primitive is a triangle, the host computer sends 12 words of vertex data for vertex 0 to the $V_0$, single word write registers. Then 12 words of vertex 1 data are written to the $V_1$, single word write registers, and 12 words of vertex 2 data are written to the $V_2$, single word write registers.

The command to process the triangle can be sent in one of two ways. In a first approach, the last word of the vertex 2 data is written to the appropriate $V_2$, single word write register, and then a produce triangle command is sent. It can be seen, however, that the produce triangle command involves the transmission of an additional word and thereby reduces the I/O bandwidth between the host computer and the graphics system.

In a second, more desirable approach, the last word of vertex 2 data is written to the appropriate $V_2$, single word write, trigger triangle register shown in Table 2. In response to writing the last word of vertex 2 data to the trigger triangle register, the vertex 2 data is written to the vertex 2 location in vertex RAM buffer 0, and processing of the triangle is automatically initiated without a separate command word. A similar approach may be used for triggering quads and vectors. Thus, processing of primitives may be initiated without transmitting an additional command word. As a result, the overall rate of data transfer from the host computer to the graphics system is increased. Furthermore, host computer overhead is decreased, because the host is not required to send a command word. As shown in Table 2, a trigger command, or trigger flag, is indicated simply by writing the last word of vertex data to the appropriate trigger register. Triggering of a quad, triangle or vector can occur on any vertex that is transmitted. By automatically triggering the processing of primitives, the host computer software is not required to reorder vertex data so that certain data comes last (indicating a trigger). Instead, the trigger "flag" is attached to the last word of vertex data. The geometry accelerator recognizes the flag and begins processing the primitive.

Additional features of the address mapping technique relate to polylines and triangles. The VM (vector move) and VD (vector draw) registers are associated with polylines. Whenever a new polyline is begun (vertex 220 and vertex 222 in FIG. 4), the host computer writes the vertex data to the VM register. When a vector is drawn to another vertex (such as from vertex 220 to vertex 180 in FIG. 4), the vertex data for subsequent vertices is written to the VD register. The address mapping logic 210 maps all VM writes to vertex 0 and alternates VD writes between vertex 1 and vertex 0 locations in the vertex RAM. The first VD write following a VM write goes to vertex 1 and thereafter alternates between vertex 0 and vertex 1 locations in the vertex RAM with each vector. Also, VD writes are mapped to the least recently written vertex location of the required vertex number in buffers 102 and 104 of the vertex RAM. In accordance with this approach, the mapping of the polylines 170 and 176 from software addresses to vertex RAM locations is shown in Table 3 below.

TABLE 3

| Vertex No. | Software Vertex | Vertex RAM |
|---|---|---|
| 1 | VM | $V_0$ Buffer 0 |
| 2 | VD | $V_1$ Buffer 0 |
| 3 | VD | $V_0$ Buffer 1 |
| 4 | VD | $V_1$ Buffer 1 |
| 5 | VM | $V_0$ Buffer 0 |
| 6 | VD | $V_1$ Buffer 0 |
| 7 | VD | $V_0$ Buffer 1 |

A similar approach is used for triangle strips. The VS (vector strip) registers are associated with triangle strips. The first triangle of a triangle strip is transmitted from the host computer to the geometry accelerator as if it were independent. Thus, in triangle strip 190 shown in FIG. 5, the vertices of triangle 191 are written to vertex registers $V_0$, $V_1$ and $V_2$. Every connected triangle of the triangle strip is drawn by simply writing one new vertex to the VS register. The address mapping logic 210 recognizes the VS address and automatically maps each vertex to the appropriate vertex location in the vertex RAM. In particular, the first VS vertex following the first triangle maps to the vertex $V_0$ location in the vertex RAM, the second VS vertex maps to vertex $V_1$, and the third VS vertex maps to vertex $V_2$, with the mapping continuing to rotate in this manner. Also, the VS writes are mapped to the least recently written vertex location of the required vertex number in buffers 102 and 104 of the vertex RAM. The mapping of the triangle strip 190 shown in FIG. 5 from software addresses to vertex RAM locations is shown in Table 4 below.

TABLE 4

| Vertex No. | Software Vertex | Vertex RAM |
|---|---|---|
| 1 | $V_0$ | $V_0$ Buffer 0 |
| 2 | $V_1$ | $V_1$ Buffer 0 |
| 3 | $V_2$ | $V_2$ Buffer 0 |
| 4 | VS | $V_0$ Buffer 1 |
| 5 | VS | $V_1$ Buffer 1 |
| 6 | VS | $V_2$ Buffer 1 |
| 7 | VS | $V_0$ Buffer 0 |

The VD register permits each new vector of a polyline to be specified by the data for one new vertex. Similarly, the VS register permits each new triangle of a triangle strip to be specified with the data for one new vertex. Since the address mapping logic 210 determines how to map these registers into the vertex RAM, software overhead is reduced.

An additional feature of the address mapping technique relates to double word writing. In particular, the address mapping technique permits writes to consecutive locations of the vertex RAM to be paired together and sent as one address and two data words. When double word writes are to be used, the host computer writes data to the appropriate double word write register shown in Table 2. This is done by writing a single address corresponding to the address of the desired double word write register, followed by two data words that are destined for consecutive locations. For example, since X and Y coordinates for each vertex are written to consecutive locations in the vertex RAM, the X and Y coordinates of a vertex may be written using a double word write. The address mapping logic 210 recognizes the double word write and writes the consecutive data words to the appropriate locations in the vertex RAM. This feature permits higher speed transfer of data from the host computer to the geometry accelerator and enables the software in the host computer to more effectively utilize high speed I/O protocols. Address mapping is described in more detail below.

Another performance enhancing technique used in the geometry accelerator relates to double buffering of the vertex RAM. More particularly, double buffering is implemented with respect to parameter groups of vertex data, rather than on a per-primitive basis. This permits performance to be enhanced beyond that which would be obtained with double buffering on a per-vertex basis. The parameter grouping, which defines the granularity of double buffering, is selected for software simplicity and enhanced performance.

In general, double buffering permits the geometry accelerator to be processing the vertex data of one primitive contained in one buffer of the vertex RAM, while the other buffer of the vertex RAM is being loaded with vertex data for the next primitive. Furthermore, it is inefficient for the host computer to send vertex data that has not changed since the last primitive. For example, when rendering primitives with constant Z values, the host computer transfers primitive data to the geometry accelerator more efficiently (resulting in faster rendering) if it only needs to send the Z value once for each vertex in the first primitive. Each subsequent primitive requires one less data word per vertex, resulting in less FIFO space being used up and faster transmission of primitive data from the host computer to the geometry accelerator.

In order to avoid sending vertex data that remains constant for two or more primitives, the concept of vertex RAM double buffering with granularity and parameter groups is utilized. According to this concept, groups of vertex parameters which usually change for each primitive or which usually change together are grouped together, and parameters which may remain constant for two or more primitives, are grouped separately. In one exemplary grouping of vertex parameters, Group 1 includes X and Y coordinates, normal coordinates NX, NY and NZ, and texture mapping coordinates S and T; Group 2 contains the Z coordinate only; Group 3 contains color coordinates R, G and B; and Group 4 contains the transparency coordinate alpha only. This grouping means that the Z coordinate can be set up for one primitive and then reused for all subsequent primitives without having to be rewritten, until a new Z coordinate is written. The same is true for alpha. Constant color values R, G and B can also be used, except that the grouping implies that if one color is written for a vertex, the other two colors must also be written. As described below, the double buffering is performed for the parameters within each group. A similar requirement applies to the grouping of X, Y, NX, NY, NZ, S and T in Group 1. If one parameter in Group 1 is written, all parameters in Group 1 must be written (except parameters that are not used).

Double buffering of the vertex RAM is controlled by a set of pointers that keeps track of which buffer in the vertex RAM contains active information. The pointers are called "using-vertex" pointers and contain 16 bits (four vertices, four parameter groups per vertex). In order to achieve double buffering, the using-vertex pointer is also double buffered. One vertex RAM buffer is used by the rendering circuitry (the transformation engine and the decomposition engine) that is performing transformations and other operations on an active primitive. The other vertex RAM buffer is being updated as vertex parameters are unloaded from the input FIFO and put into the inactive buffer of the vertex RAM. In summary, vertex data for successive primitives is written in alternating buffers of the vertex RAM. When the rendering circuitry reads vertex data, it takes data from the most recently written buffer. Where the vertex data is changing with each primitive, the rendering circuitry reads from alternating buffers in the vertex RAM. However, where vertex data within a parameter group remains constant for two or more primitives, the rendering circuitry reads data from the most recently written location, as indicated by the using-vertex pointers. Thus, for example, where the Z coordinate of a vertex remains constant for several primitives, the rendering circuitry reads the Z coordinate for that vertex from the most recently written buffer. This gives rise to a situation where data is being written to a buffer from the input FIFO and data is simultaneously being read from the same buffer by the rendering circuitry. Accordingly, the vertex RAM must be dual-ported to permit reading and writing at the same time.

Figure 7:
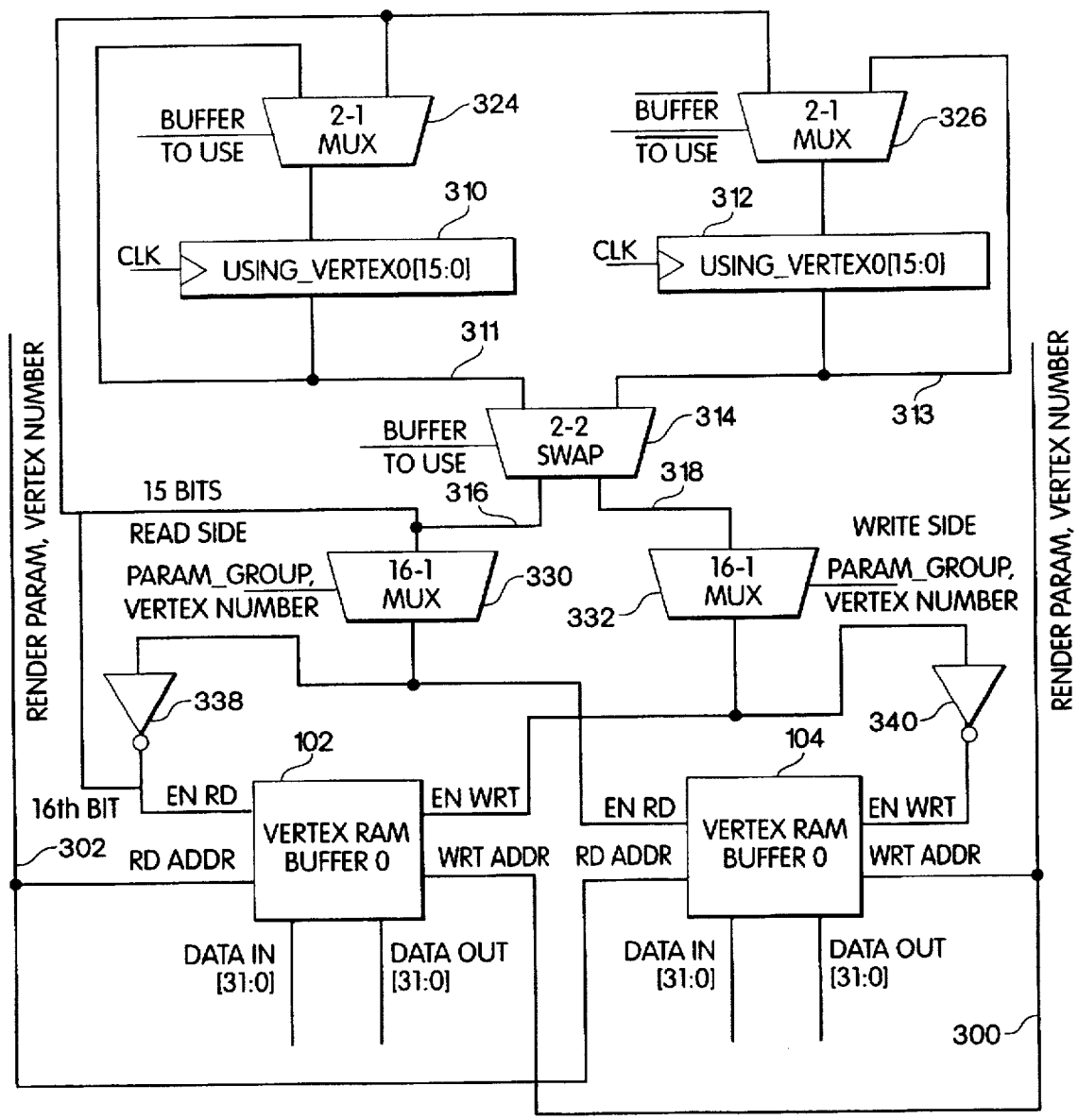
FIG. 7 is a simplified block diagram of one implementation of the read/write control shown in FIG. 6.

A block diagram of read/write control 212 (see FIG. 6) for double buffered reading and writing of the vertex RAM is shown in FIG. 7. As indicated above, each vertex RAM buffer 102 and 104 is dual-ported and thus includes write address lines, a write enable line and data input lines for writing, and read address lines, a read enable line and data output lines for reading. The data inputs for each vertex RAM are supplied from the input FIFO 100 (FIG. 3). Data outputs from each vertex RAM are supplied to the processing circuitry in the left stack 110 of the geometry accelerator for rendering computations. A write address on bus 300 is received from the address mapping logic 210 and identifies a vertex number and a specific parameter of the vertex being written. Similarly, a read address on bus 302 is received from the left stack control unit 122 and specifies a vertex number and a specific parameter of the vertex being read.

The write enable and read enable lines of each vertex RAM are controlled by the using-vertex pointers stored in registers 310 and 312. One of the using-vertex pointers controls writing to the vertex RAM, and the other using-vertex pointer controls reading from the vertex RAM. As indicated previously, each using-vertex pointer contains 16 bits, one bit for each of four parameter groups for each of the four vertices that may be stored in a vertex RAM buffer. The contents of using-vertex register 310 are supplied on a bus 311 to first inputs of a two-way swap circuit 314 and to first inputs of a 2-1 multiplexer 324. The contents of using-vertex register 312 are supplied on a bus 313 to second inputs of swap circuit 314 and to first inputs of a 2-1 multiplexer 326. The 2-1 multiplexers 324 and 326 are controlled by a buffer-to-use signal and the inverted buffer-to-use signal, respectively.

The swap-circuit 314 is controlled by the buffer-to-use signal. In one state of the buffer-to-use signal, the contents of register 310 appear on output bus 316 of swap circuit 314, and the contents of register 312 appear on output bus 318 of swap circuit 314. In the other state of the buffer-to-use signal, the swap circuit 314 supplies the contents of register 310 on bus 318 and supplies the contents of register 312 on bus 316. The buffer-to-use signal switches states after data for a primitive has been written to one of the vertex RAM buffers 102 and 104. Output bus 316 of swap circuit 314 is connected to the inputs of a 16-1 read multiplexer 330. Fifteen bits of bus 316 are connected to second inputs of each of multiplexers 324 and 326. The sixteenth bit of the second inputs to multiplexers 324 and 326 is obtained from the output of an inverter 338. Output bus 318 of swap circuit 314 is connected to the inputs of a 16-1 write multiplexer 332.

The output of multiplexer 330 is connected to the read enable line of vertex RAM buffer 104 and is connected through inverter 338 to the read enable line of vertex RAM buffer 102. Similarly, the output of multiplexer 332 is connected directly to the write enable line of the vertex RAM buffer 102 and is connected through an inverter 340 to the write enable line of vertex RAM buffer 104. The read multiplexer 330 is controlled by four bits, two of which specify a vertex number and two of which specify a parameter group for reading. Similarly, the write multiplexer 332 is controlled by four bits, two of which specify a vertex number and two of which specify a parameter group for writing. Each of the multiplexers 330 and 332 selects one bit from the using-vertex register to which it is connected. Thus, a selected bit in one using-vertex register controls the buffer to be written through multiplexer 332, and a selected bit in the other using-vertex register controls the buffer to be read through multiplexer 330.

As indicated above, the buffer-to-use signal controls 2-1 multiplexer 324, and the inverted buffer-to-use signal controls 2-1 multiplexer 326. In one state of the buffer-to-use signal, the contents of register 310 are recycled through multiplexer 324 to register 310. Similarly, in one state of the buffer-to-use signal, the contents of register 312 are recycled through multiplexer 326 to register 312. In the other state of each signal, 15 bits of bus 316 output of swap circuit 314 and the output of inverter 338 are copied into the registers 310 and 312. Thus, the bit in the using-vertex pointer corresponding to the vertex and parameter group enabled for reading by the output of inverter 338 is changed in state.

Figure 8:
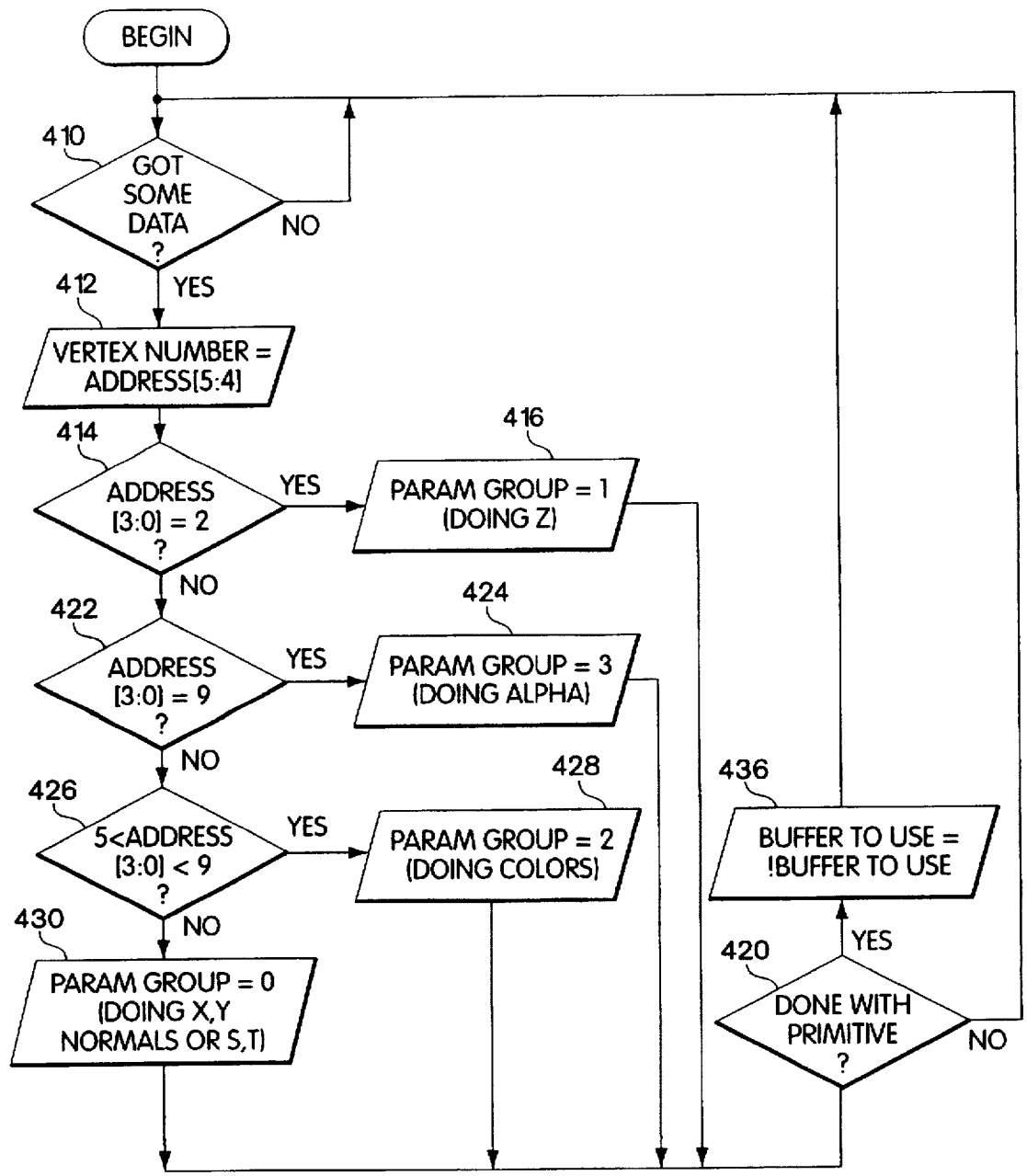
FIG. 8 shows a flow diagram of a process for writing primitive data into the vertex RAM.

A flow diagram of the process for writing data in the vertex RAM is shown in FIG. 8. The writing process begins when data is present in the input FIFO 100, as determined in step 410. The address associated with the data is mapped by address mapping logic 210 as described above. The write address is supplied on bus 300 to vertex RAM buffer 102 and vertex RAM buffer 104. For an exemplary 6-bit address, bits 4 and 5 specify the vertex number and bits 0–3 specify the vertex parameter to be written. As indicated above, multiplexers 332 is controlled by four bits which indicate the vertex number and parameter group for writing. The vertex number is obtained directly from bits 4 and 5 of the write address. The parameter group is obtained from bits 0–3 of the write address. As shown in FIG. 8, when bits 0–3 of the write address have a value of 2, as determined in step 414, the parameter group is set to 1 in step 416. Parameter group 1 corresponds to the Z coordinate of the vertex. When the vertex number and parameter group are supplied to the multiplexer 332, the bit corresponding to that vertex number and parameter group in one of the using-vertex registers 310 and 312 is selected. The selected bit is supplied by multiplexer 332 to enable writing in either buffer 102 or buffer 104 in accordance with the state of the selected bit. Next it is determined in step 420 whether all vertex data for the primitive has been written to the vertex RAM. Until all vertex data has been written, the process of FIG. 8 is repeated. When bits 0–3 of the address have a value of 9, as determined in step 422, the parameter group is set to 3 in step 424. Parameter group 3 corresponds to the alpha color value of the vertex. When bits 0–3 of the write address have a value in the range of 4 to 8, as determined in step 426, the parameter group is set to 2 in step 428. Parameter group 2 corresponds to the color values R, G and B of the vertex. When bits 0–3 of the write address do not fall within the values determined in steps 414, 422, and 426, the parameter group is set to 0 in step 430. This corresponds to the X and Y coordinates, the normal values NX, NY and NZ, and the texture values S and T. In each of steps 424, 428 and 430, the values of the vertex and parameter group select a corresponding bit in the appropriate using-vertex register 310 or 312. The selected bit controls the vertex RAM buffer to be written. The process is repeated for each vertex in the primitive. After all vertex data for a primitive has been written into the vertex RAM, the state of the buffer-to-use bit is changed in step 436. This causes the swap circuit 314 to reverse the connections between registers 310 and 312 and multiplexers 330 and 332. Data for the next primitive is written in the other vertex RAM buffer.

Figure 9:
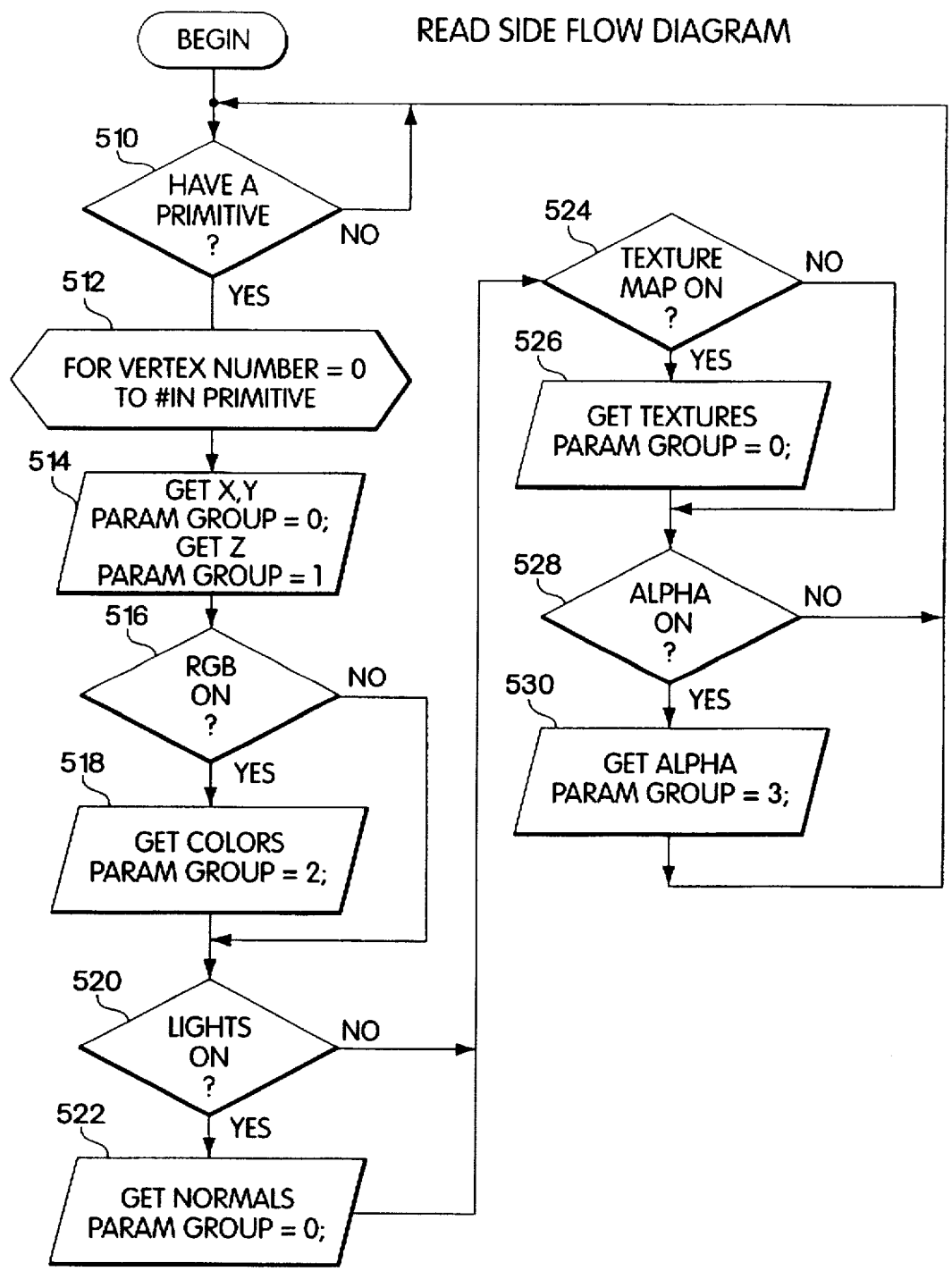
FIG. 9 shows a flow diagram of a process for reading primitive data from the vertex RAM.

A flow diagram of the process for reading data from the vertex RAM is shown in FIG. 9. When primitive data is present in one of the vertex RAM buffers, as determined in step 510, addresses for reading the primitive data are placed on bus 302 by the left stack control unit 122. For an exemplary 6-bit read address, bits 4 and 5 establish the vertex number, and bits 0–3 identify the vertex parameter to be read. The read multiplexer 330 is controlled by four bits, including a 2-bit vertex number obtained directly from the read address and a parameter group derived from bits 0–3 of the read address. Step 512 in FIG. 9 indicates that the read process is repeated for each vertex in the primitive. In step 514, the parameter group is first set to 0, and the X and Y coordinates of the vertex are read. Then, the parameter group is set to 1 and the Z coordinate of the vertex is read. If color is enabled, as determined in step 516, the parameter group is set to 2 in step 518 and the color values are read from the vertex RAM. If lighting is enabled, as determined in step 520, the parameter group is set to 0 in step 522, and the normal parameters NX, NY and NZ are read from the vertex RAM. If texture mapping is enabled, as determined in step 524, the parameter group is set to 0 and texture values S and T are read from the vertex RAM in step 526. If alpha is enabled, as determined in step 528, the parameter group is set to 3 in step 530 and the alpha value is read from the vertex RAM. In each case, the parameter group is determined by decoding bits 0–3 of the read address. The process is repeated until all primitive data has been read from the vertex RAM buffer.

In the manner described above, the using-vertex pointers control the vertex RAM buffer from which data is read. In a case where all used parameters are sent by the host computer to the geometry accelerator for each vertex, all data for a primitive is obtained from one vertex RAM buffer, and the data for the next primitive is obtained from the other vertex RAM buffer. In that case, reading alternates between the vertex RAM buffers on a primitive-by-primitive basis. In the case described above where data within parameter groups remains constant over two or more primitives, the data for that parameter group is transmitted only once. The using-vertex pointer in this instance points to the most recently written vertex RAM buffer for that parameter group.

Consider an example where the Z coordinate of a vertex remains constant for several primitives. The Z coordinate is transmitted for the first vertex having that Z coordinate and is stored, for example, in vertex RAM buffer 102. More particularly, assume that vertex 0 of a first primitive has a Z coordinate of 10 and is stored in vertex RAM buffer 102. The data for a second primitive is stored in vertex RAM buffer 104. Assuming that vertex 0 of the second primitive also has a Z coordinate=10, the Z coordinate of vertex 0 is not transmitted with the second primitive. The first primitive is read in the normal way, with successive parameter values in vertex RAM buffer 102 being read in succession. When the processing circuitry reads the parameter values of the second primitive, the new values are read from vertex RAM buffer 104. However, the required Z coordinate is read from vertex RAM buffer 102, because the using-vertex pointer points to the most recently written value of the parameter group in buffer 102. This operation may result in simultaneous reading and writing in one of the vertex RAM buffers.

An example of rendering triangles using the double buffered vertex RAM with granularity is illustrated in FIGS. 10-A and 10-B. The parameters sent by the host computer for four triangles, triangles 1, 2, 3 and 4, are shown in FIGS. 10-A and 10-B. The triangles may have constant Z values and may have constant R, G and B values. Other parameters are ignored in this example.

All used parameters for all vertices must be sent for the first triangle. If all subsequent triangles have a Z coordinate= 10, vertex 0 of the second triangle must be set to that value, but the other vertices of the second triangle already contain that value of Z. Note that although triangle 2, vertex 1 green did not change, the red value did change, so the entire parameter group, red, green and blue, must be sent. The processing circuitry always reads the correct values of Z from the most currently written buffer of the vertex RAM. For triangle 2, vertex 0, the location is buffer 0. Now assume that the remaining triangles are all white (R=G=B=1). The vertex 0 color is already set at white in triangle 2, and is not sent for triangles 3 and 4. Vertices 1 and 2 of triangle 3 must be set to color white. No Z values are sent for triangles 3 and 4, but both read the value of 10 from the correct buffer. Triangle 4 has no parameters except for the X and Y coordinates. The most current buffer of the vertex RAM is used per parameter group, per vertex. Where parameters are constant over two or more primitives, the requirements for data transmission from the host computer are reduced significantly.

Techniques for reading primitive data from the vertex RAM buffers 102 and 104, performing transformations and decompositions and writing the resulting data into primitive RAM buffers 132 and 134 are now described. For normal, unconnected primitives, the operations are performed on an alternating basis with vertex RAM buffers 102 and 104 and primitive RAM buffers 132 and 134. In particular, data for a first primitive is read from vertex RAM 102 and is processed by the transformation and decomposition engines. The resulting data is written in primitive RAM buffer 132. At the same time, data for a second primitive is being written from the input FIFO 100 into vertex RAM buffer 104. When the operations on the first primitive are completed, the left stack notifies the right stack, and the right stack begins processing the data for the first primitive contained in primitive RAM buffer 132. Simultaneously, data for the second primitive is read from the vertex RAM buffer 104 and is processed by the transformation and decomposition engines. The resulting data is written into primitive RAM buffer 134. At the same time, data for a third primitive is written into the vertex RAM buffer 102. When processing of the second primitive is complete, the left stack notifies the right stack, and the right stack begins processing the data for the second primitive contained in primitive RAM buffer 134. The transformation and decomposition engines process the data for the third primitive and write the results in the primitive RAM buffer 132. This process continues on an alternating basis with respect to vertex RAM buffers 102 and 104 and with respect to primitive RAM buffers 132 and 134. The transformation engine and the decomposition engine are parts of the left stack control unit 122 and separately control the processing circuitry of the left stack.

The transformation operations involve the transformation of the primitive coordinates X, Y and Z received from the host computer into device coordinate space by multiplying the primitive coordinates by a 4-by-4 transform matrix. The elements of the transform matrix are supplied by the host computer. The decomposition operations include the calculation of slopes DX and DY for vectors and for edges of triangles. Decomposition also involves subdividing quadrilaterals into triangles.

According to a further aspect of the invention, a hardware technique for managing the data shared by polylines and triangle strips enhances the performance of the geometry accelerator. A number of the operations performed by the transformation and decomposition engines involve calculations on a vertex-by-vertex basis, and for edges of triangles. Where the vertices are shared between polylines or triangle strips and where edges are shared between triangle strips, it is inefficient to perform the same calculations twice. The present invention avoids the need to repeat calculations for shared vertices and shared edges.

In the processing of polylines and triangle strips, the geometry accelerator performs initial calculations on a complete set of new vertices for the given primitive. For example, processing of a triangle strip starts with calculations for the three vertices of the first triangle and all three edges, and processing of a polyline starts with calculations for the first two vertices of the polyline. Subsequent to the first full primitive, the geometry accelerator receives vertex data for only one new vertex for each new primitive to be generated. For example, each subsequent triangle in a triangle strip requires only one new set of vertex data. The other two sets of vertex data are obtained from the previous triangle. Each segment, or vector, in a polyline needs only one new set of vertex data. The other set of vertex data is obtained from the previous segment. The geometry accelerator stores the results of calculations from previous vertices and only performs calculations for the new vertex. The geometry accelerator does not repeat calculations for previous vertices. This enhances performance because the software in the host computer needs to send data for each vertex only once, and the geometry accelerator hardware needs to perform calculations for each vertex only once.

To facilitate data management, the geometry accelerator utilizes several storage locations in a unique manner. The storage locations include the register file 114 and the primitive RAM buffers 132 and 134. The register file 114 is a group of storage registers that are closely tied to the floating point math units. The register file can easily be accessed by the ALU 118 and the multiplier 120, with single state write and read performance. For polylines and triangle strips, the geometry accelerator maps a large section of the register file 114 into areas called register set 0 and register set 1, which are jointly designated as a "ping-pong buffer". Register set 0 and register set 1 are accessed by two pointers: a Current Pointer, which indicates data locations that are currently being worked on, and a Last Pointer, which indicates locations that are filled with data from the last vertex worked on. Each time the geometry accelerator begins work on a new vertex, the two pointers are switched, i.e., the pointer that indicates register set 0 "ping-pongs" between being the Current Pointer and the Last Pointer, and the register set 1 pointer does the reverse. The transformation engine (TE) and the decomposition engine (DE) each have a Current Pointer and a Last Pointer. In this manner, the geometry accelerator keeps track of where current vertex calculations are stored and where previous calculations are stored.

The primitive RAM buffers 132 and 134 permit the left stack of the geometry accelerator to work with one buffer while the right stack works with the other buffer. This allows simultaneous work by the left and right stacks on two separate primitives and prevents the left and right stacks from corrupting each other's data. For polylines and triangle strips, previous calculations for a given primitive are stored in one buffer and must be conceptually copied to the other buffer for use in the subsequent primitive. Actual copying cannot take place, because a primitive RAM buffer cannot be simultaneously accessed by both the left and right stacks. When the left stack writes primitive data into a primitive RAM buffer, it keeps track of the locations used and writes the same data into the other primitive RAM buffer in the same locations for use by subsequent primitives.

Figure 11:
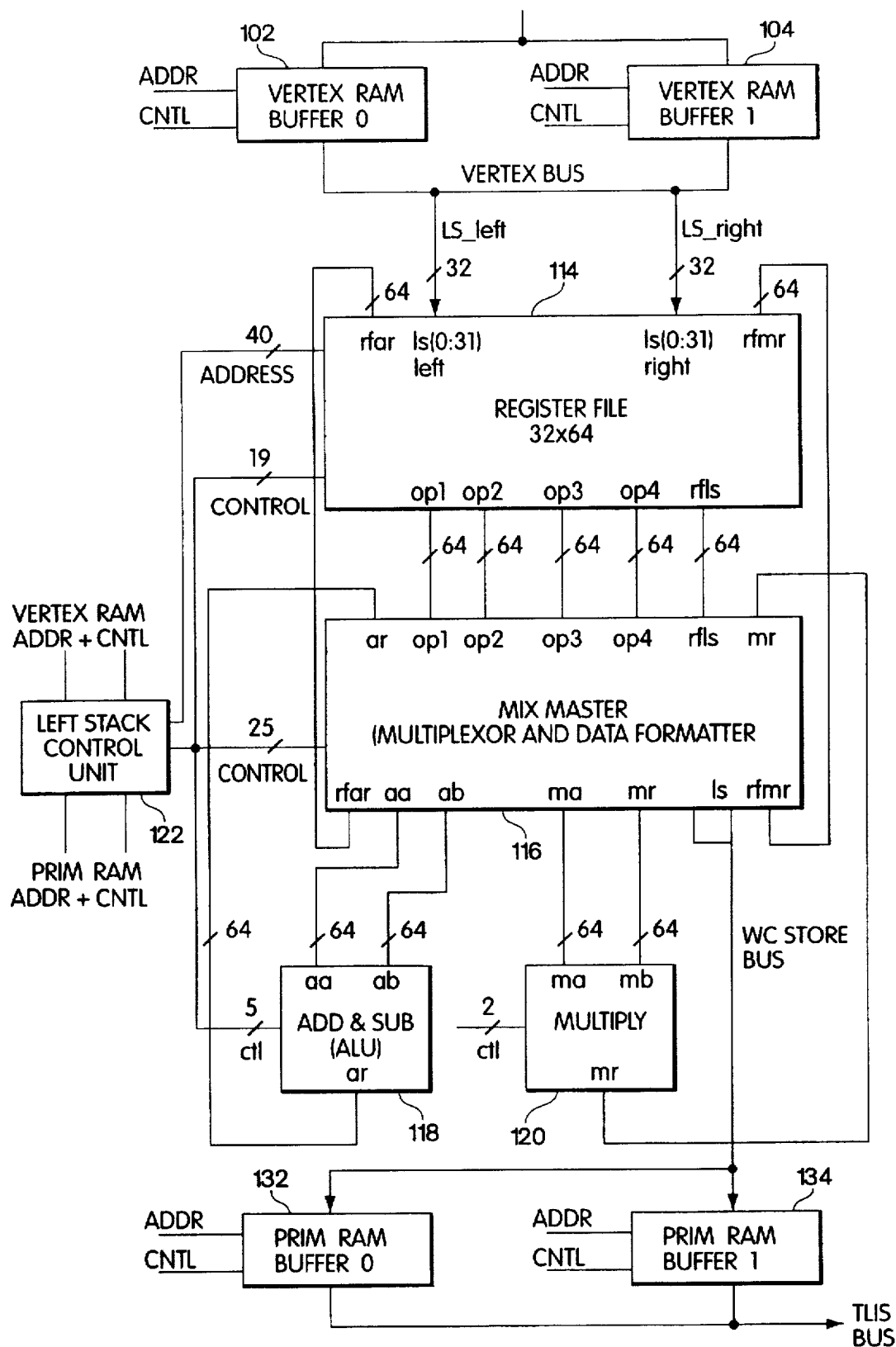
FIG. 11 is a more detailed block diagram of the processing circuitry in the left stack of the geometry accelerator.

A partial block diagram RAM of processing circuitry in the left stack 110 (FIG. 3) of the geometry accelerator is shown in FIG. 11. The register file 114 receives input data from the vertex RAM buffers 102 and 104 on the vertex bus. The multiplexer 116, under control of the transformation engine and the decomposition engine in left stack control unit 122, supplies data from the register file 114 to the ALU 118 and the multiplier 120. The ALU 118 and the multiplier 120 perform the operations described herein under control of the transformation engine and the decomposition. The results of the calculations are supplied through multiplexer 116 to the register file 114. The results, as well as data not involved in the calculations, are transferred from the register file 114 through the multiplexer 116 to the primitive RAM buffers 132 and 134 on the WC store bus. The left stack control unit 122 supplies addresses to the vertex RAM buffers 102 and 104, the register file 114 and the primitive RAM buffers 132 and 134. In addition, the left stack control unit 122 supplies control signals to the vertex RAM buffers 102 and 104, the register file 114, the multiplexer 116, the ALU 118, the multiplier 120 and the primitive RAM buffers 132 and 134.

The organization of the register file 114 is shown in FIG. 12. The register file has locations for transformed parameter values (XT0, XT1, etc.), the transform matrix parameters and the clip limits. Temp 0 and temp 1 are scratch locations. The register file also contains storage for the edge slopes (DY1, etc.). DXY1 is storage for edge 4 (shared edge) DY value, and DXY0 is the edge 4 DX value.

The organization of the primitive RAM buffers 132 and 134 is shown in FIG. 13. Each buffer has space for four vertices, each of which is arranged as shown in FIG. 13.

Figure 14A:
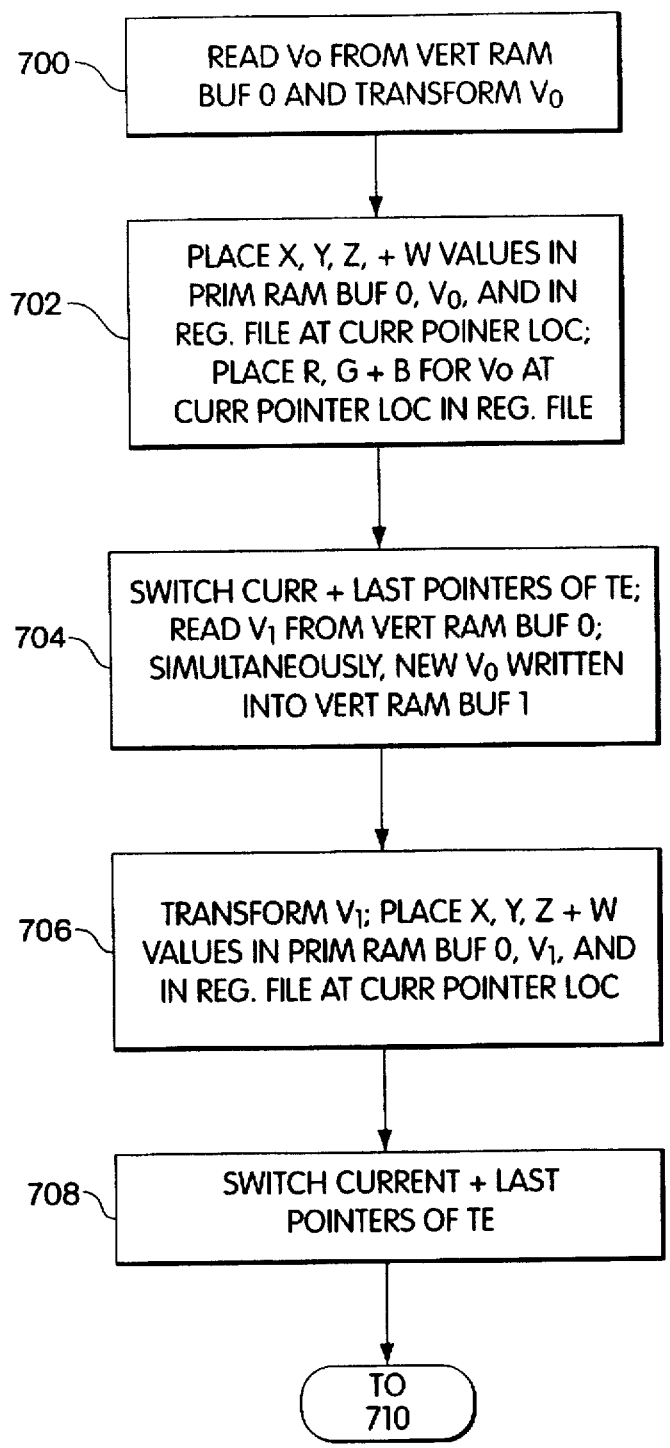
FIGS. 14A and 14B show a flow diagram of a process for transformation of polylines.
Figure 14B:
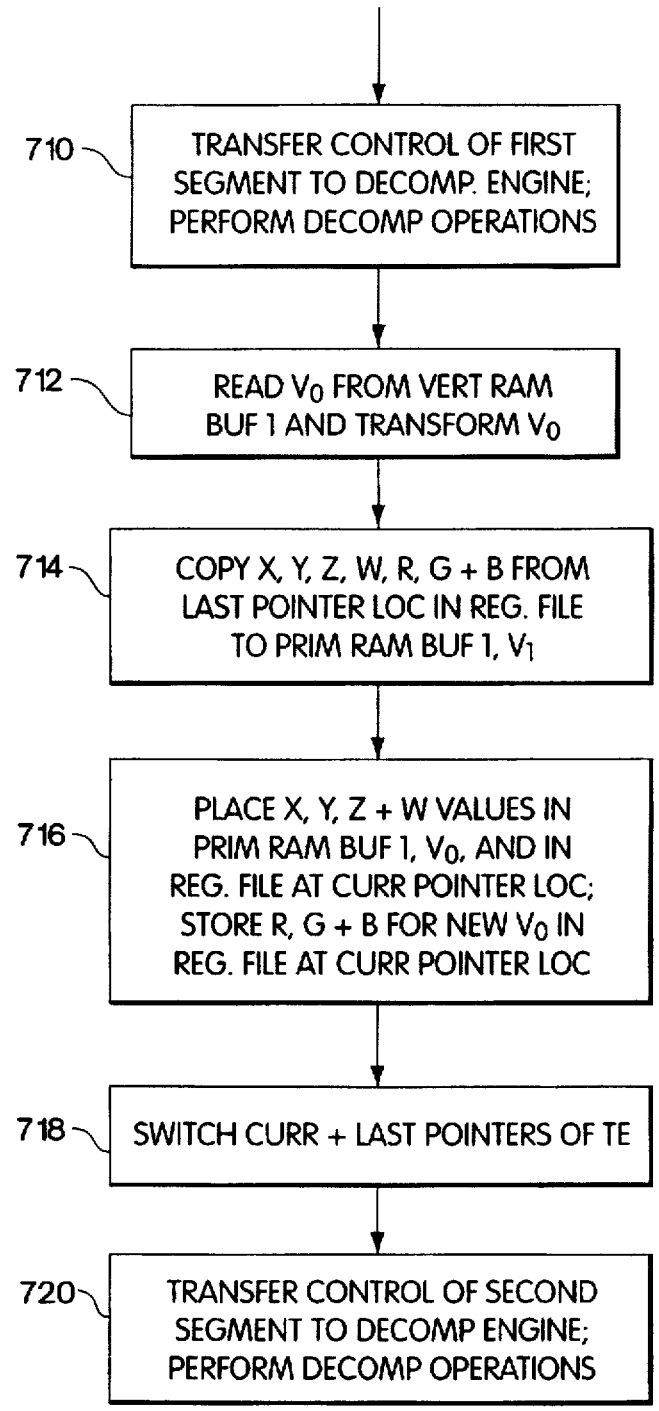

The transformation of polylines is described with reference to FIGS. 14A and 14B. The transformation engine (TE) performs the required matrix calculations on the first segment 171 of polyline 170 (FIG. 4), which is represented by two new sets of vertex data. The two sets of vertex data are stored in vertex RAM buffer 102 in two groups of locations known as vertex 0 ($V_0$) and vertex 1 ($V_1$). The transformation engine reads vertex 0 data, processes it through the floating point math units and produces four output values X, Y and Z, spatial coordinate values, and W, a perspective value in step 700. The X, Y, Z and W values are written in primitive RAM buffer 132, in a set of locations designated vertex 0 in step 702. The X, Y, Z and W values are also stored in the register file 114 in the register set selected by the Current Pointer. The TE also reads the red, green and blue values (R, G and B) for vertex 0 from vertex RAM buffer 102 and stores them in the Current Pointer locations in the register file 114, as indicated in step 702.

Next, the Current and Last Pointers of the TE are switched in step 704 so that the Last Pointer selects the vertex 0 data in the register file, and the Current Pointer selects an unwritten section of the register file. Also in step 704, the TE reads vertex 1 data from the vertex RAM buffer 102. Simultaneously with the other operations in step 104, a new vertex 0, the third vertex of the polyline, is written into vertex RAM buffer 104. In step 706, the vertex 1 data is processed through the floating point math units, and the X, Y, Z and W values are written in primitive RAM buffer 132 in a set of locations designated vertex 1. The X, Y, Z and W values are simultaneously stored in the register file 114 in the Current Pointer locations. The R, G and B data for vertex 1 is read from vertex RAM buffer 102 and is stored in the Current Pointer area of the register file. The TE switches the Current and Last Pointers in step 708, so that the Last Pointer now indicates the data for vertex 1 that was just calculated. Control of the first segment of the polyline is transferred to the decomposition engine in step 710. The decomposition engine operates on the data for the first segment, as described below, in step 710.

After the decomposition engine has completed its operations on the first segment, the new vertex 0 data for a second line segment of the polyline is read from vertex RAM buffer 104 and is processed through the floating point math units in step 712. The data from the Last Pointer locations in the register file, including X, Y, Z, W, R, G and B, is copied to primitive RAM buffer 134 and placed in the vertex 1 locations in step 714. This is the vertex that is shared between the first two segments of the polyline. The X, Y, Z and W values are stored in primitive RAM buffer 134 in the vertex 0 locations (step 716). The X, Y, Z and W values are also stored in the Current Pointer locations in the register file 114. R, G and B data for the new vertex 0 is read from vertex RAM 104 and is also stored in the Current Pointer locations of the register file (step 716). Primitive RAM buffer 134 now contains a full segment of the polyline, even though only one new set of vertex data was received by the geometry accelerator. The Current and Last Pointers of the TE are switched in step 718. Control of the second line segment is transferred to the decomposition engine in step 720.

The transformation engine continues in the manner described above for all subsequent vertices in the polyline. New vertices are read from vertex RAM buffers 102 and 104 and the calculated results are placed alternately in the primitive RAM buffers 132 and 134. The last vertex for a given line segment is retrieved from the register file and is placed in the primitive RAM buffer that is receiving data for a current vertex. The Current and Last Pointers are switched for each new vertex. Every time the TE finishes a line segment, control is transferred to the decomposition engine.

The decomposition engine calculates delta X (DX) and delta Y (DY) values with W, the perspective parameter, multiplied through. Additional parameters, including colors, lighting normals, texture parameters and alpha, are copied from either the register file or the vertex RAM into the primitive RAM. The decomposition engine also utilizes ping-pong buffering. When delta values are computed, they are placed into the active primitive RAM.

Figure 15:
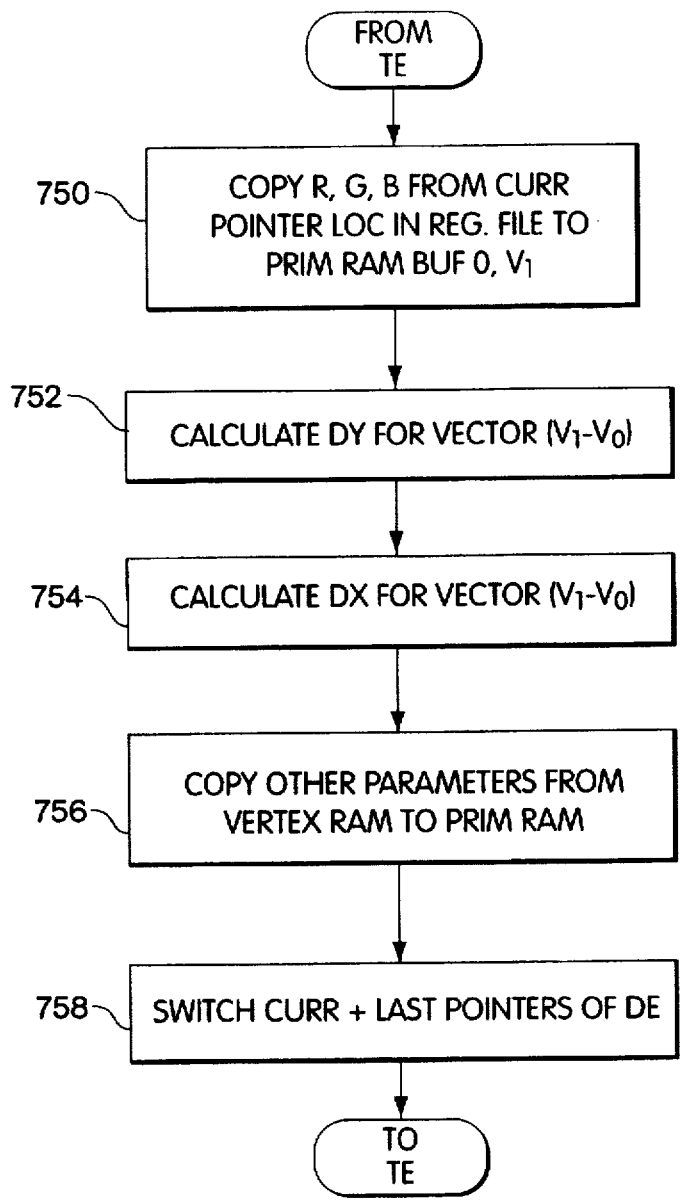
FIG. 15 shows a flow diagram of a process for decomposition of polylines.

The operations of the decomposition engine in steps 710 and 720 (FIG. 14B) are shown in FIG. 15. R, G and B values are copied from Current Pointer locations in the register file 114 (currently pointing to the first vertex 1) to primitive RAM buffer 132 in step 750. (The transformation engine wrote R, G and B values for vertex 0 into the primitive RAM 132.) Next, delta Y is computed in step 752 for the two vertices of the segment, always subtracting the Last Pointer location from the Current Pointer location (multiplying W through, if necessary) to preserve the rendering direction for the polyline. Delta X is computed in a similar manner in step 754. Additional parameters are copied from the vertex RAM to the primitive RAM, if necessary, in step 756. The destination vertex number matches the source vertex number. For example, vertex 0 from the vertex RAM goes to vertex 0 of the primitive RAM. The Current and Last Pointers for the decomposition engine are switched in step 758.

For the next segment, the Current and Last Pointers have been switched; the old vertex of the register file is vertex 1 of the last segment, and the Current Pointer indicates the new vertex 0 of the next segment. The resulting segment data is written to the other primitive RAM, in this case primitive RAM buffer 134. Steps 750–758 are repeated for each segment of the polyline, always switching the Current and Last Pointers and always swapping primitive RAM buffers.

Figure 16A:
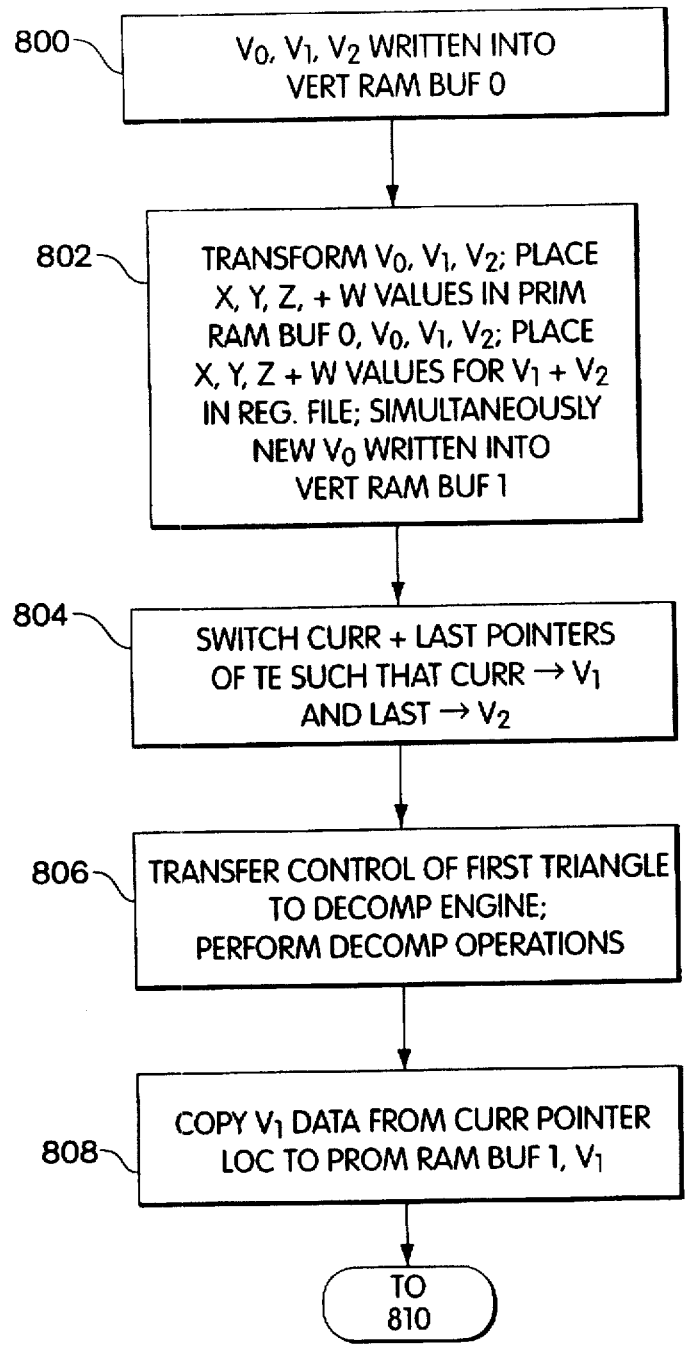
FIGS. 16A and 16B show a flow diagram of a process for transformation of triangle strips.
Figure 16B:
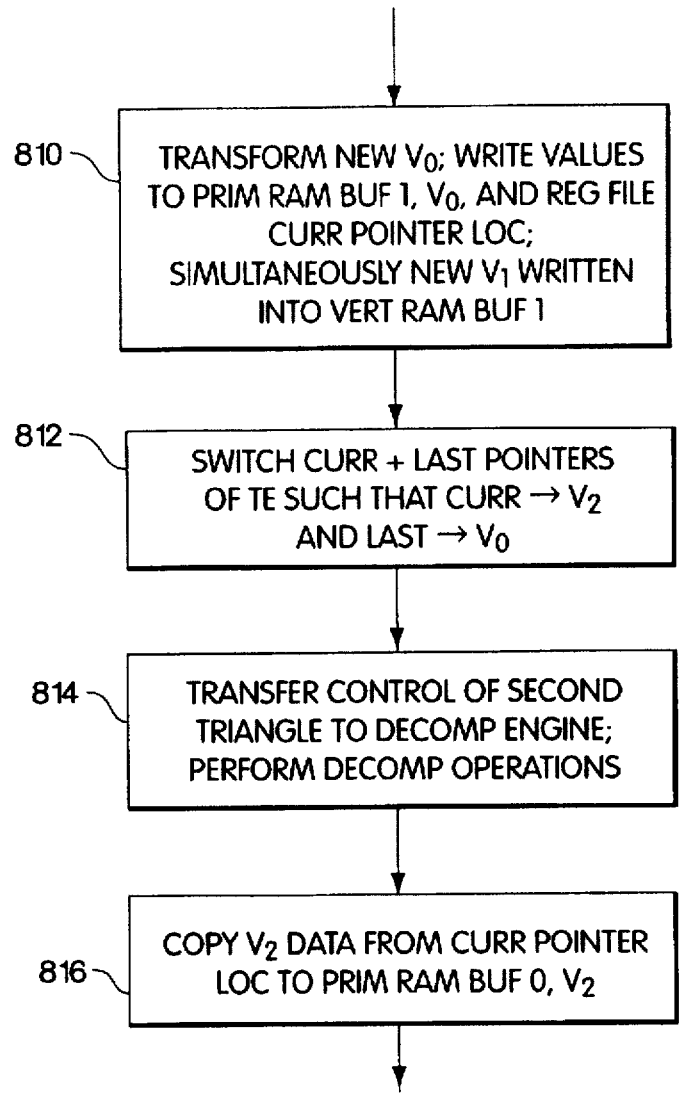

Triangle strip transformations are similar in concept to polyline transformations. As shown in FIGS. 16A and 16B, the first three sets of triangle vertex data for vertex 0, vertex 1 and vertex 2 are written to vertex RAM buffer 102 in step 800. The TE processes the data one vertex at a time, placing all the transformed X, Y, Z and W values in primitive RAM buffer 132 (step 802). The TE also places copies of the transformed X, Y, Z and W values for vertex 1 and vertex 2 in the register file 114. After processing the first triangle, the Current Pointer indicates vertex 2 data, and the Last Pointer indicates vertex 1 data. Simultaneously with the other operations in step 802, data for new vertex 0 for a second triangle of the triangle strip is written into vertex RAM buffer 104. The Current and Last Pointers for the TE are switched in step 804, such that the Current Pointer indicates vertex 1 data, and the Last Pointer indicates vertex 2 data. Control of the first triangle of the triangle strip is transferred to the decomposition engine in step 806. The decomposition engine operates on the data for the first triangle, as described below, in step 806.

After the decomposition engine has completed its operations on the first triangle, the TE copies vertex 1 data from the Current Pointer location in the register file to primitive RAM 134 vertex 1 location in step 808. The TE then performs calculations for the new vertex 0 and writes the transformed X, Y, Z and W values to primitive RAM 134 vertex 0 and register file 114 Current Pointer locations in step 810. Simultaneously with the other operations in step 810, new vertex 1 data for a third triangle of the triangle strip is written into the vertex RAM buffer 104.

In this manner, the TE transfers data belonging to one of the shared vertices (vertex 1) into the primitive RAM before it overwrites the data in the register file with new calculations from the new vertex 0. The decomposition engine later transfers the other shared vertex data to the primitive RAM. The Current and Last Pointers for the TE are switched in step 812, such that the Current Pointer indicates vertex 2 data, and the Last Pointer indicates vertex 0 data in the register file. Control of the second triangle of the triangle strip is transferred to the decomposition engine in step 814, and the decomposition engine operates on the data for the second triangle. After the decomposition engine has completed its operations on the second triangle, the shared vertex 2 data is copied from the register file Current Pointer locations to primitive RAM buffer 132 in step 816, before overwriting the Current Pointer locations in the register file with new calculations for vertex 1. Steps 812, 814 and 816 are essentially repetitions of steps 804, 806 and 808, respectively, except that the pointers are indicating different vertices. The TE repeats this process until the end of the triangle strip.

For decomposition of triangle strips, there is one new vertex but only one shared edge between adjacent triangles in the strip. To maximize performance, the edges are remapped to appropriate locations and previously uncopied parameters are copied from the register file or vertex RAM to the primitive RAM. After the edge delta values are computed, they are always placed into the active primitive RAM buffer and the register file in case of edge reuse.

Figure 17A:
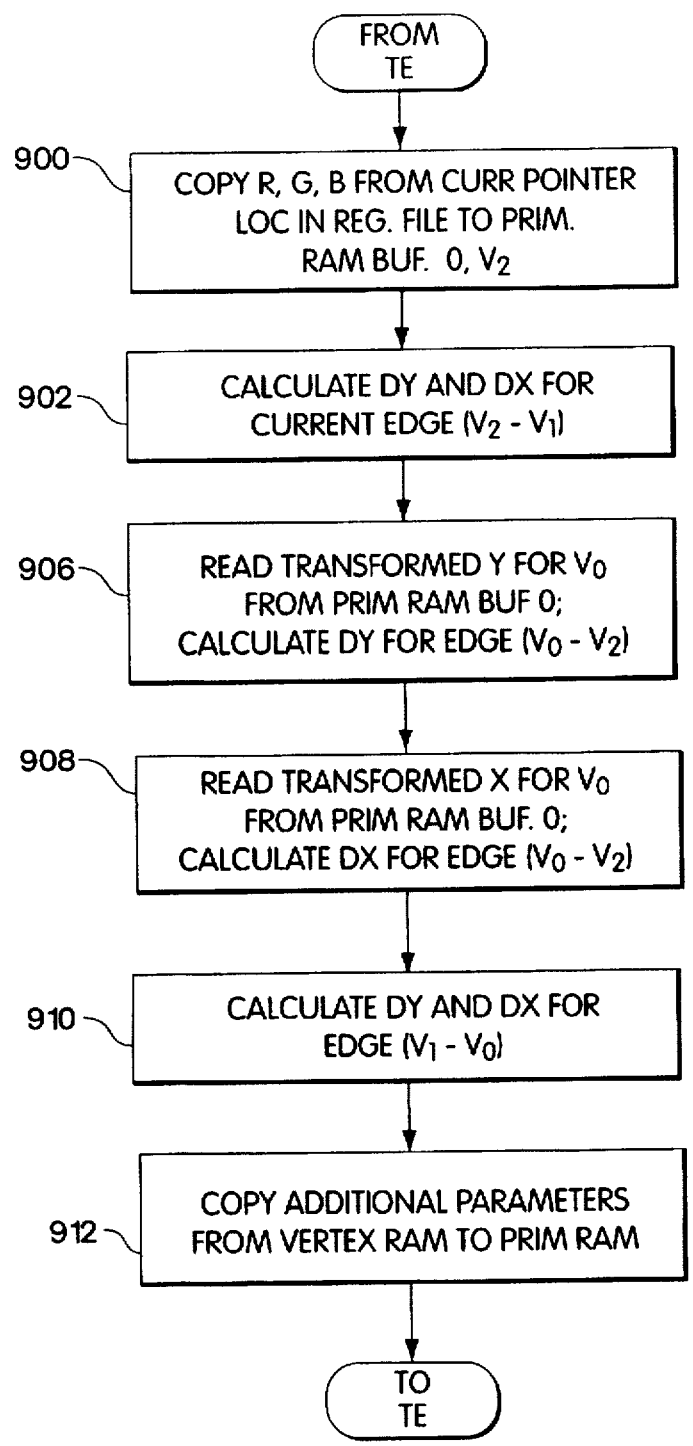
FIGS. 17A and 17B show a flow diagram of a process for decomposition of triangle strips.
Figure 17B:
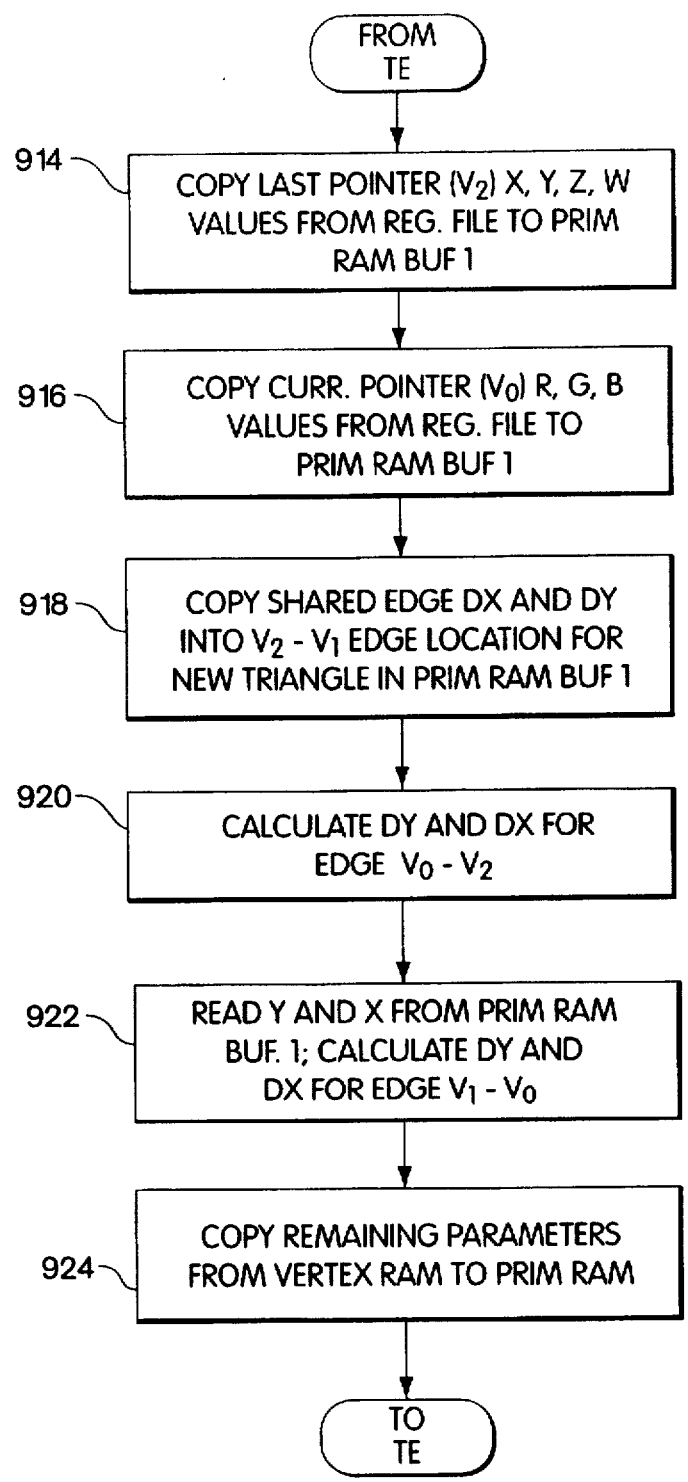

Referring to FIGS. 17A and 17B, the process for decomposition of triangle strips is shown. Decomposition operations for the first triangle of a triangle strip (step 806 in FIG. 16A) are shown in FIG. 17A. The first triangle has three new vertices. Initially, R, G and B values for the current vertex, as indicated by the Current Pointer, vertex 2 of the triangle, are copied from the register file 114 to the vertex 2 locations of the active primitive RAM buffer, for example, primitive RAM buffer 132, in step 900. Next, delta Y for the current edge, the edge defined by the Last Pointer and the Current Pointer, is computed in step 902. For the first triangle, this is the edge defined by vertex 2-vertex 1. The perspective parameter W is appropriately multiplied through, if necessary. Delta X for the current edge is computed in a similar manner in step 902. Next, the transformed Y value for the vertex not contained in the register file, in this case vertex 0, is obtained from the active primitive RAM buffer 132 and is used to calculate delta Y for the edge defined by that vertex and the current vertex (vertex 2) in step 906. A similar sequence is performed for the X value in step 908. Then, the delta Y and delta X values for the edge defined by the Last Pointer (vertex 1) and the vertex not shared (vertex 0) from the primitive RAM are computed in step 910. Next, the additional parameters that could not be copied during the previous operations of the TE are copied from the vertex RAM to the correct primitive RAM in step 912. As with polylines, the vertices match in number from source to destination.

For triangle strips, only one new vertex is obtained for each subsequent triangle. Decomposition operations for the second triangle of a triangle strip (step 814 in FIG. 16B) are shown in FIG. 17B. The first new vertex maps to vertex 0. The transformation engine copied data for the last vertex to the primitive RAM. In this case, the transformation engine copied vertex 1 data from the register file to vertex 1 in primitive RAM buffer 132 (step 808). Then, the Current and Last Pointers were switched, so now the Last Pointer indicates vertex 2 data, and the Current Pointer indicates the new vertex 0 data. Next, transformed X, Y, Z and W values for the last vertex, in this case vertex 2, are copied from the register file 114 to the active primitive RAM buffer 134 in step 914. Then the R, G and B values for the current vertex, vertex 0 in this case, are copied from the register file 114 to the primitive RAM buffer 134, in step 916. The shared edge data, delta X and delta Y, are copied from the register file 114 into the correct edge location for the new triangle in primitive RAM buffer 134 in step 918. In this case, the shared edge is the one between vertex 1 and vertex 2. Since this edge data was already calculated, time is saved by reusing this data. In parallel with the copying of steps 914, 916 and 918, delta Y and delta X for the edge defined by the current vertex (vertex 0) and the last vertex (vertex 2) are computed in step 920. Next, Y and X values for the vertex not available in the register file, in this case vertex 1, (recall that the TE overwrote them) are obtained from the active primitive RAM buffer 134 and used to calculate the delta X and delta Y values for the edge defined by that vertex and the current vertex (vertex 1-vertex 0) in step 922. Finally, additional parameters that could not be copied during the previous operations are copied from the vertex RAM to the correct primitive RAM buffer. As with polylines, the vertices match in number from source to destination. For additional triangle strip primitives, steps 914 to 924 are repeated, with the shared edge rotating between the three possibilities. The new vertex and the vertices indicated by the ping-pong pointers are also rotated. By simply copying the data rather than recomputing it, significant time is saved.

Figure 18:
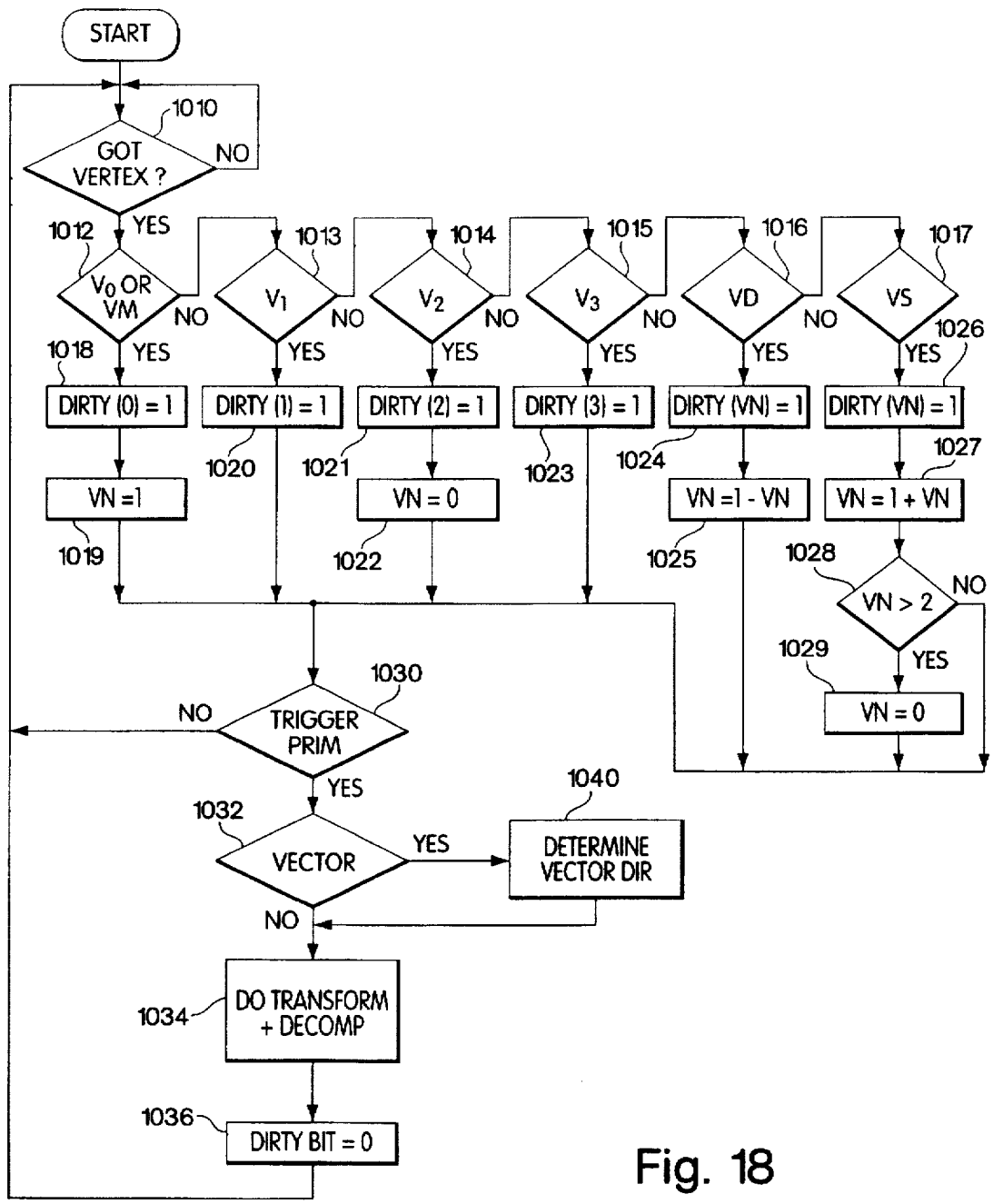
FIG. 18 shows a flow diagram of a process for controlling dirty bits and determining vector direction.

Addressing of the vertex RAM buffers 102 and 104, the register file 114 and the primitive RAM buffers 132 and 134 by the transformation engine and the decomposition engine is now described. Initially, the use of "dirty" bits to indicate the status of calculations for each vertex is discussed. Each vertex in a primitive to be rendered has an associated "dirty bit". Thus, a primitive may have up to four dirty bits associated with its four vertices. When the dirty bit for a vertex is set, calculations are required for the corresponding vertex data. A flow chart of the control of the dirty bits is shown in FIG. 18. The control of a vector direction bit is also shown in FIG. 18. When vertex data is received in step 1010, the vertex number is tested in steps 1012, 1013, 1014, 1015, 1016 and 1017. When the new vertex is vertex $V_0$ or VM, dirty bit 0 is set is step 1018 and a variable VN is set to 1 in step 1019. When the new vertex is vertex $V_1$, dirty bit 1 is set in step 1020. When the new vertex is vertex $V_2$ dirty bit 2 is set in step 1021, and VN is set to 0 in step 1022. When the new vertex is vertex $V_3$, dirty bit 3 is set in step 1023. When the new vertex is vertex VD, dirty bit VN is set in step 1024, and VN is set to 1-VN in step 1025. When the new vertex is vertex VS, dirty bit VN is set to 1 in step 1026, and VN is set to 1+VN in step 1027. Following step 1027, if VN is greater than 2 (step 1028), VN is set to 0 in step 1029. Otherwise, VN is left unchanged. If the vertex data contains a trigger primitive command, as determined in step 1030, and the primitive is not a vector as determined in step 1032, the transformation and decomposition operations are performed in step 1034. Then the dirty bit for that vertex is set to 0 in step 1036, indicating that the data for that vertex has been processed. When the vertex data does not contain a trigger primitive command, as determined in step 1030, the routine returns to wait for additional vertex data. When the primitive is determined to be a vector in step 1032, the vector direction is determined and a vector direction bit is set in step 1040.

As indicated above, Current and Last Pointers are used to reference the register file 114. Referring to FIG. 12, the register file has a location XT0 for the current X coordinate and a location XT1 for the last X coordinate. Similar locations are provided for Y and Z coordinates, perspective W and color values R, G and B. The ping-pong pointer is used to reference either the current or the last location for each parameter value.

With respect to the primitive RAM, buffers 132 and 134, the appropriate vertex is addressed by the two least significant bits (LSB's) of the address. The LSB's of the primitive RAM are designated "tlisLSB's" in the following discussion. The LSB's for the primitive RAM buffers are obtained differently, depending on whether the primitive is a polyline or triangle strip, or any other type of primitive. Thus, the designation "LSB'sForStrips" applies to polyline and triangle strip single vertex calculations. The designation "LSB'sForNormalCopies" applies to primitives other than polylines and triangle strips, and is used for moving data to the last vertex written location. The LSB's for the primitive RAM are defined as follows:

```
if (polyline)
    lsbsForStrips[1] = 0
    lsbsForStrips[0] dirty_bit[0]
else
    lsbsForStrips[1] = dirty_bit[1]
    lsbsForStrips[0] = dirty_bit[0]
    lsbsForNormalCopies[1] = tlisLSBs[1] and tlisLSBs[0]
    lsbsForNormalCopies[0] = tlisLSBs[0] (inverted)
```

Figure 19A:
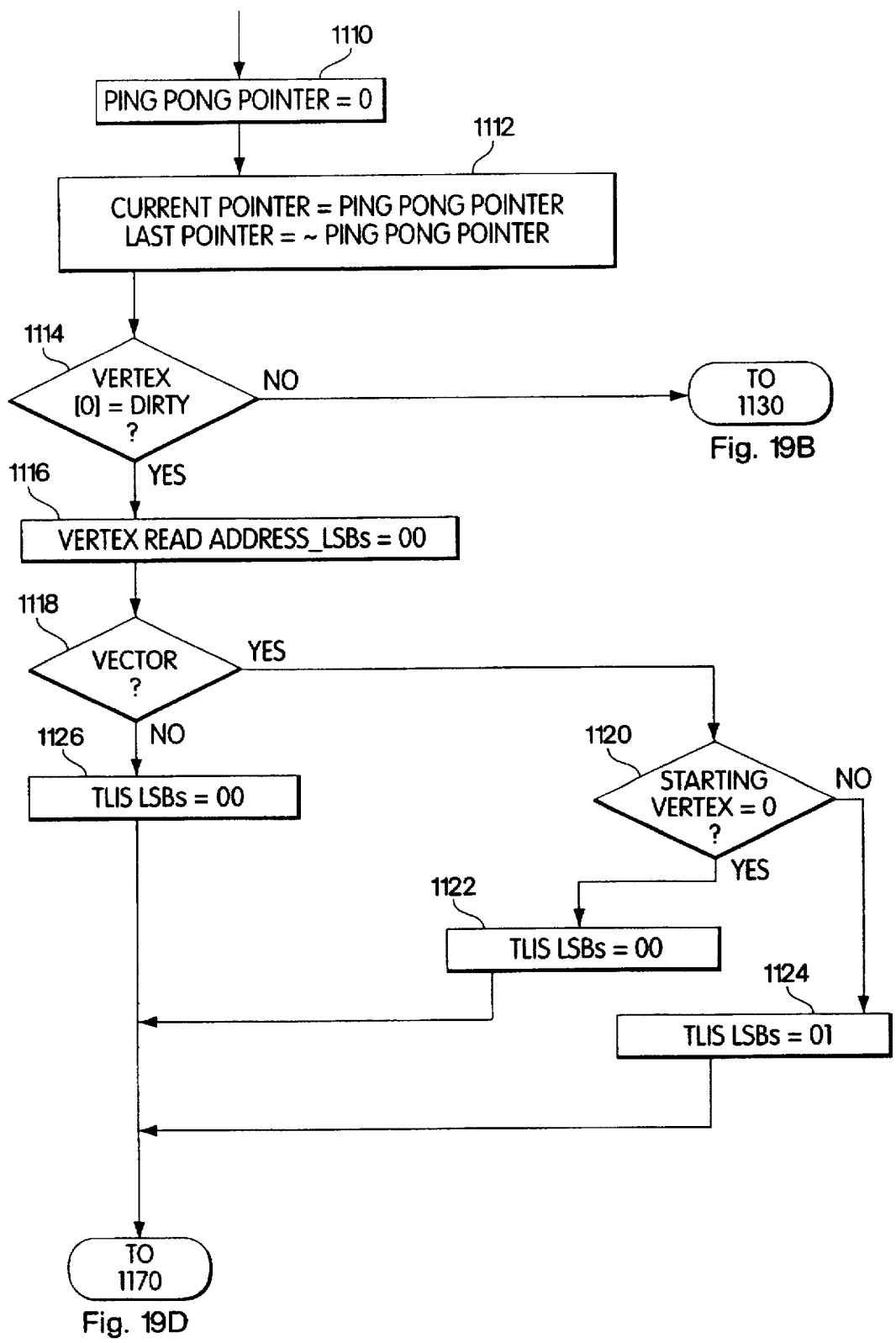
FIGS. 19A to 19H show a flow diagram of a process for address generation and processing by the transformation engine.

Address generation by the transformation engine is described with reference to FIGS. 19A to 19H. Referring to FIG. 19A, the ping-pong pointer is set to 0 in step 1110. The Current Pointer of the TE is set to the ping-pong pointer and the Last Pointer is set to the inverted ping-pong pointer in step 1112. If dirty bit 0 is set, as determined in step 1114, the vertex read address LSB's for the vertex RAM are set to 00 in step 1116. If the primitive is a vector, as determined in step 1118, and the vector starting vertex is vertex 0, as determined in step 1120, the primitive RAM LSB's are set to 00 in step 1122. If the vector starting vertex is not 0, as determined in step 1120, the primitive RAM LSB's are set to 01 in step 1124. If the primitive is not a vector, the primitive RAM LSB's are set to 00 in step 1126.

Figure 19B:
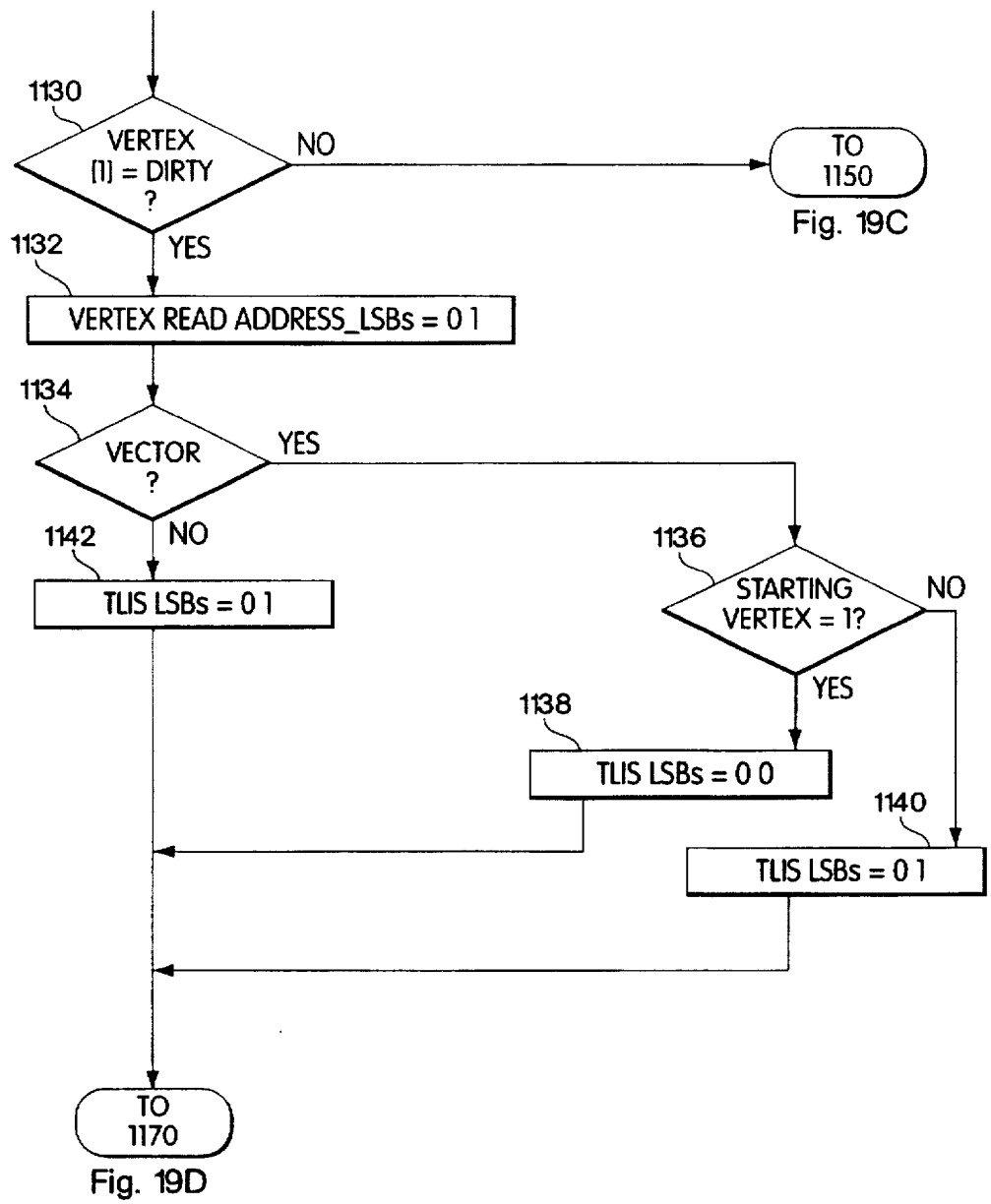

If dirty bit 0 is not set (step 1114), dirty bit 1 is tested in step 1130 (FIG. 19B). If dirty bit 1 is set, the vertex read address LSB's are set to 01 in step 1132. If the primitive is determined to be a vector in step 1134 and the starting vertex is vertex 1 (step 1136), the primitive RAM LSB's are set to 00 in step 1138. If the vector starting vertex is not vertex 1, the primitive RAM LSB's are set to 01 in step 1140. If the primitive is not a vector, the primitive RAM LSB's are set to 01 in step 1142.

Figure 19C:
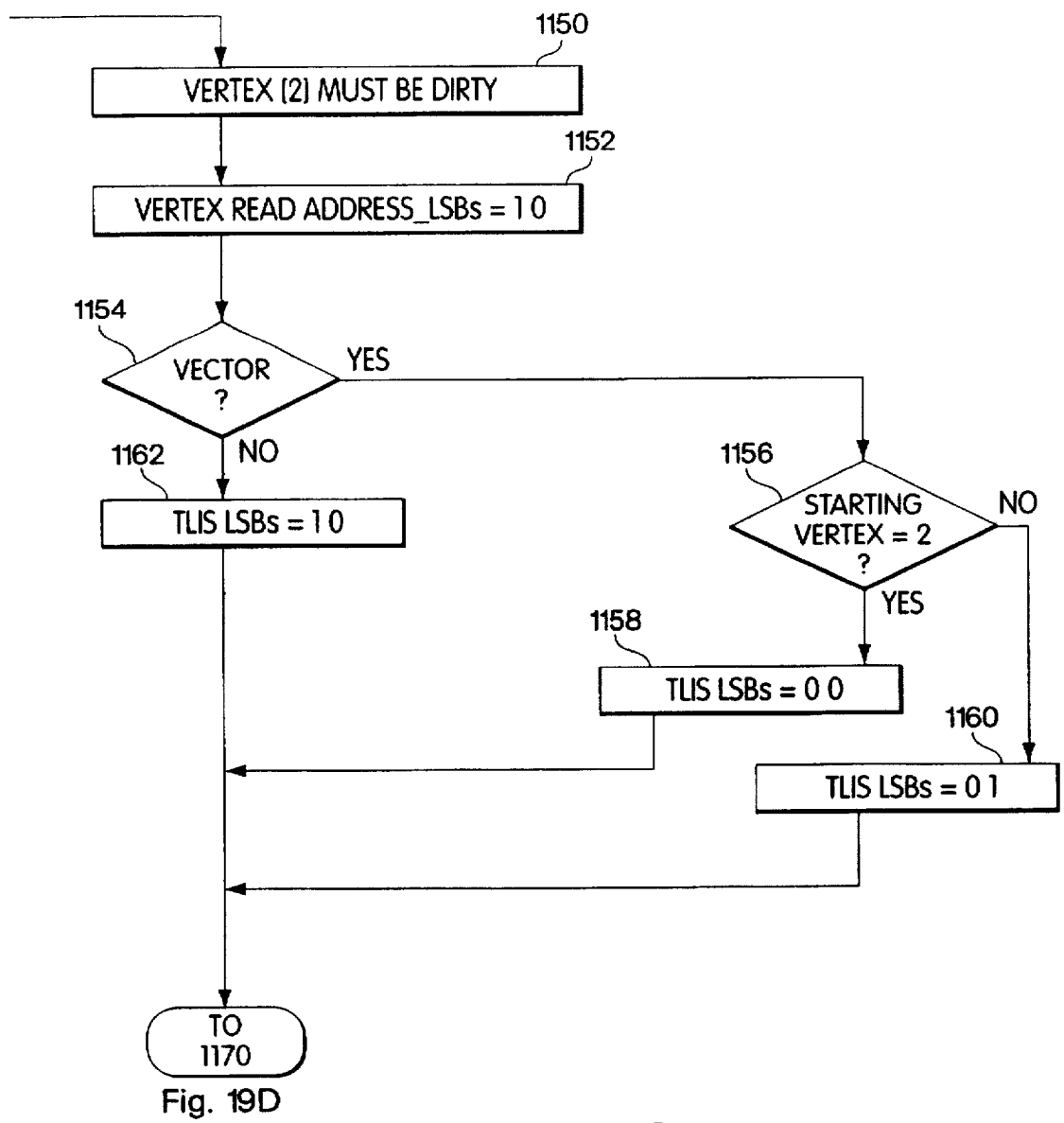
Figure 19D:
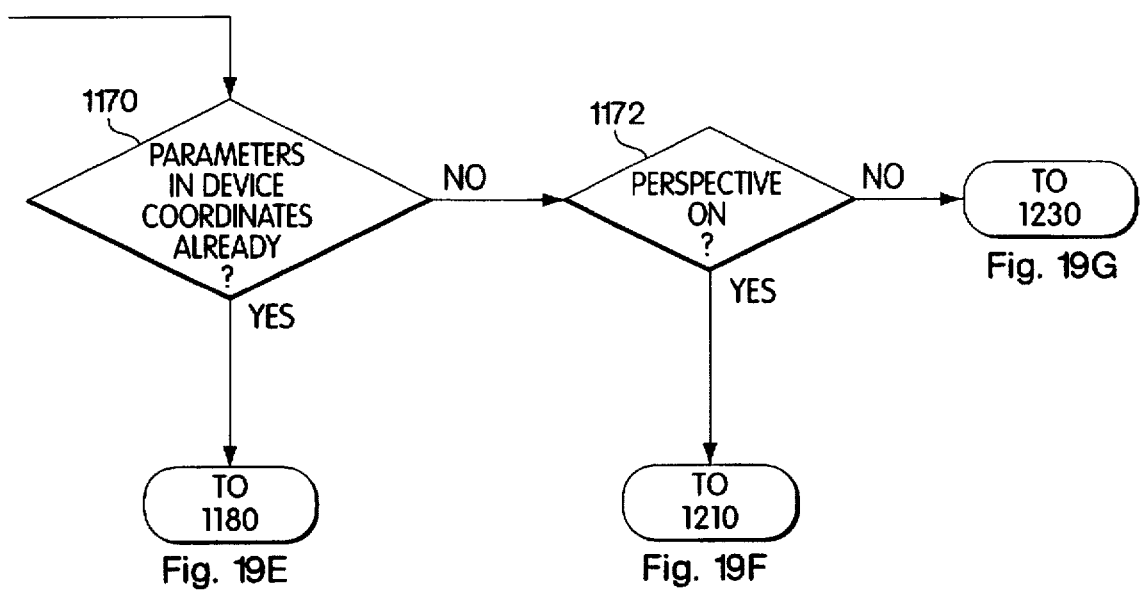
Figure 19E:
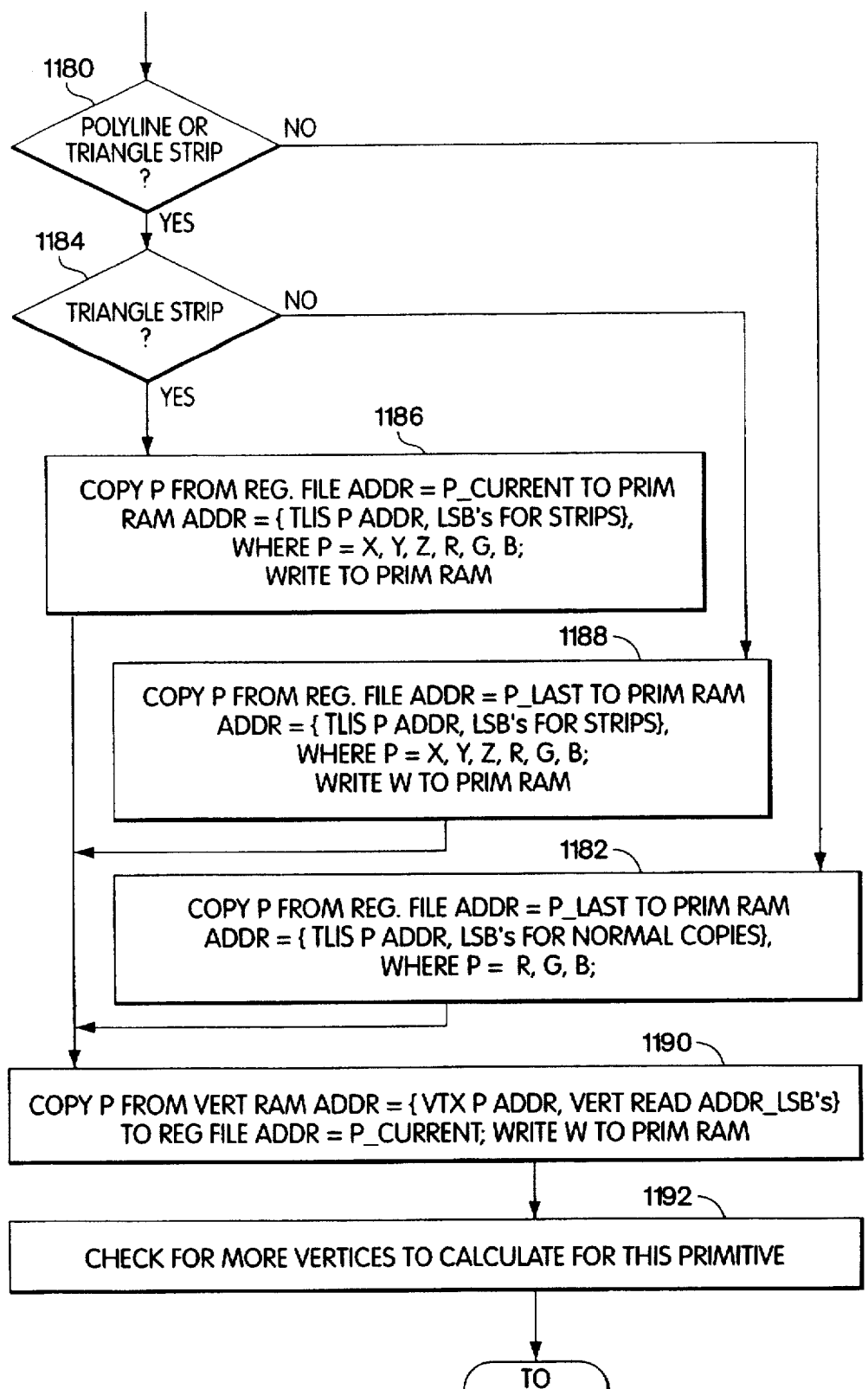
Figures 19F, 19H:
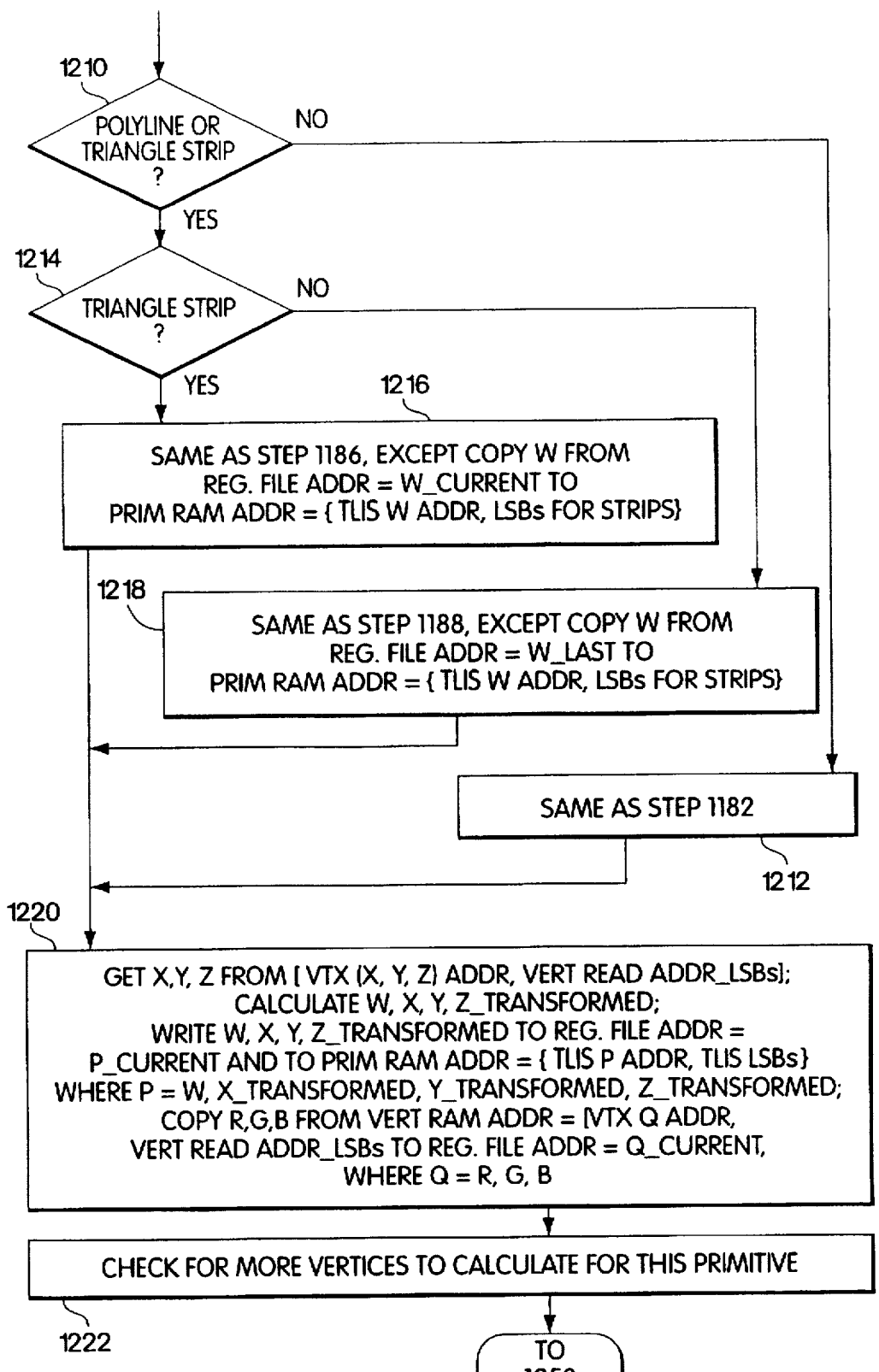
Figure 19G:
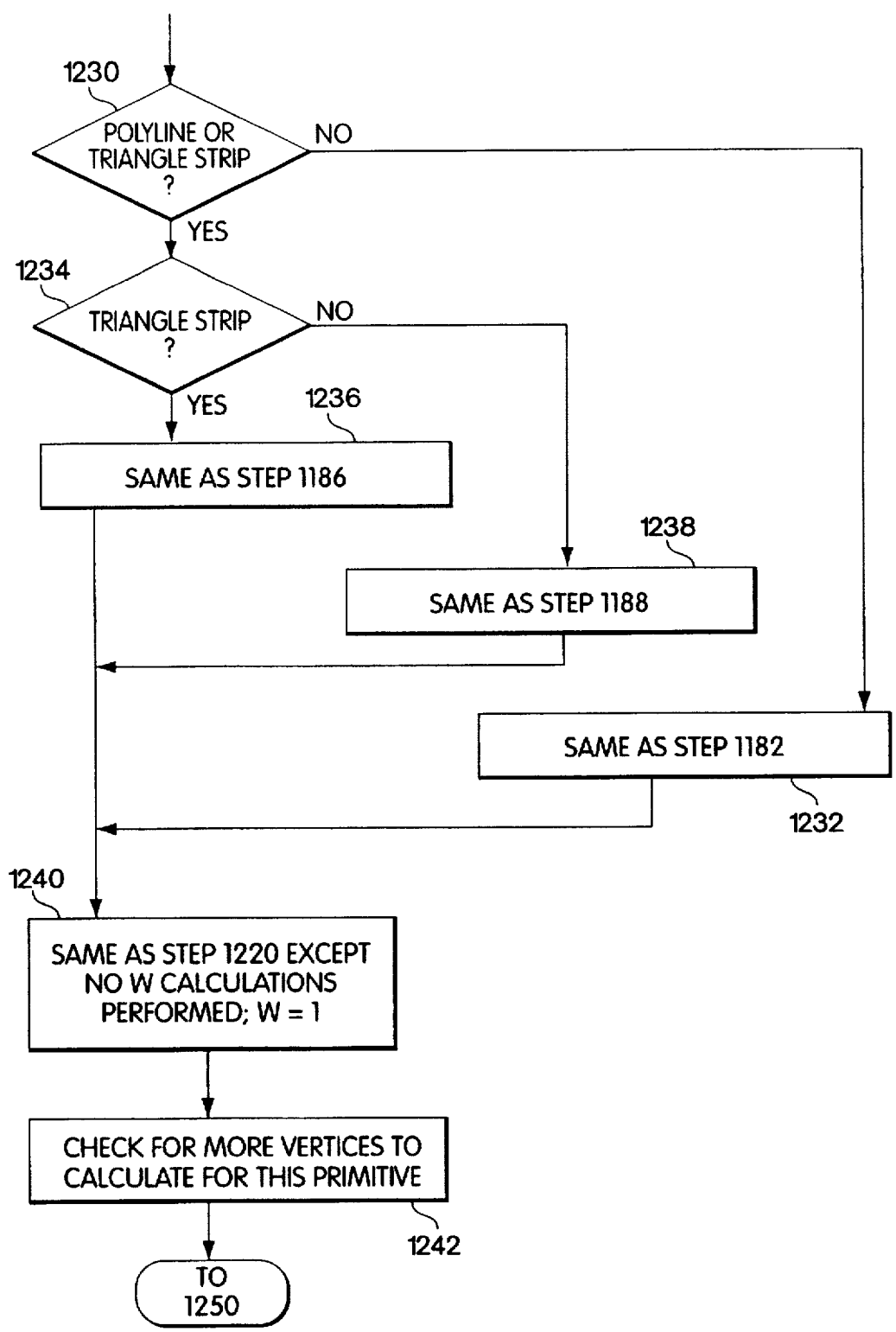
Figure 19H:
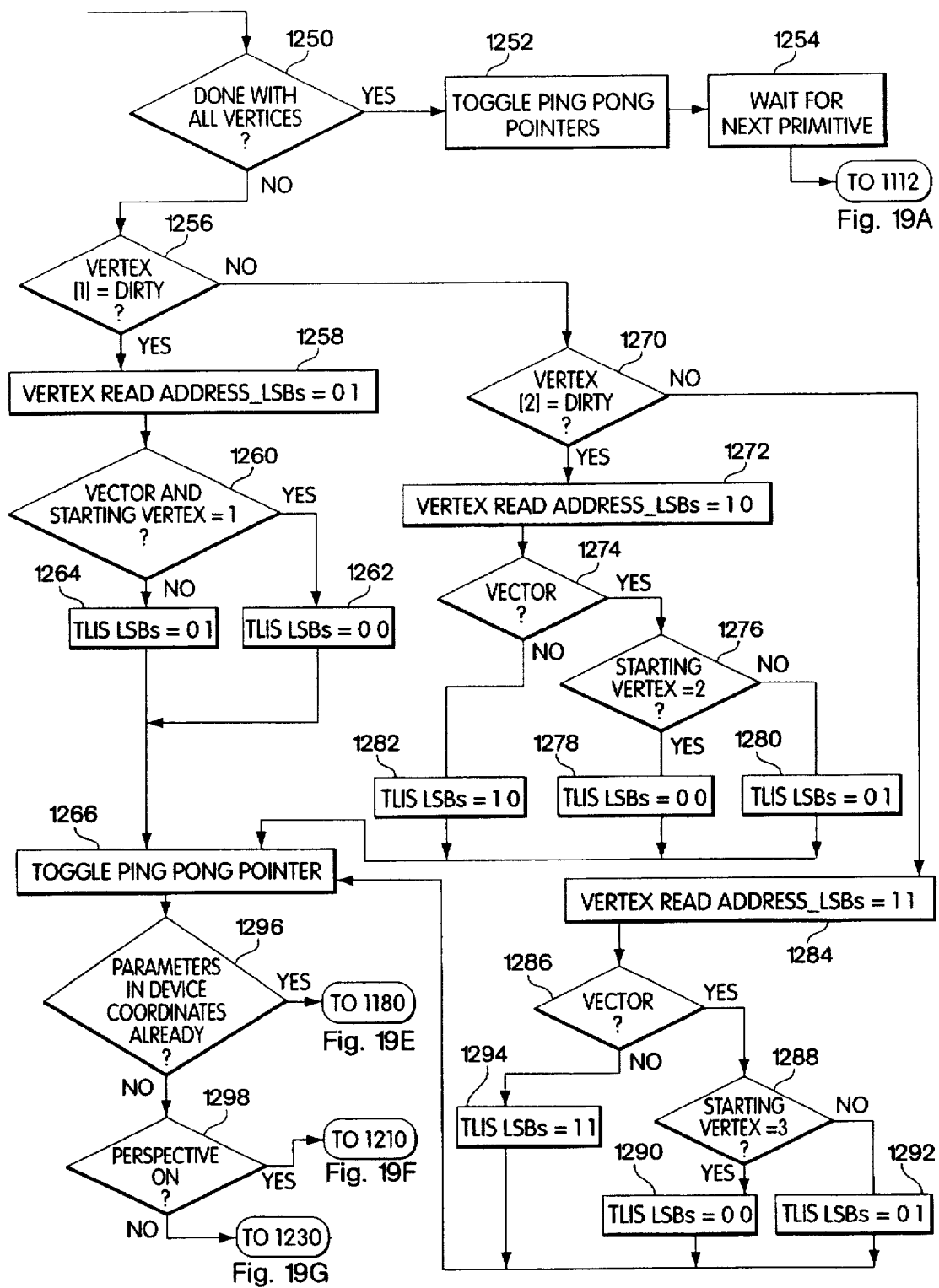

If dirty bit 1 is not set, as determined in step 1130, then dirty bit 2 must be set (step 1150 in FIG. 19C). The vertex read address LSB's are set to 10 in step 1152. When the primitive is a vector (step 1154) and vertex 2 is the vector starting vertex (step 1156), the primitive RAM LSB's are set to 00 in step 1158. When vertex 2 is not the vector starting vertex, the primitive RAM LSB's are set to 01 in step 1160. When the primitive is not a vector, the primitive RAM LSB's are set to 10 in step 1162.

After the primitive RAM LSB's have been set as shown in FIGS. 19A to 19C and described above, step 1170 (FIG. 19D) determines whether the parameters are in device coordinates and transformation is not required. This may occur when the host computer performs the transformation operations and provides the vertex data in device coordinates. When the parameters are in device coordinates, and the primitive is not a polyline or triangle strip, as determined in step 1180 (FIG. 19E), the red, green and blue values are copied from the register file locations indicated by the Last Pointer to the corresponding primitive RAM addresses using the LSB'sForNormalCopies (step 1182). If the primitive is determined in step 1184 to be part of a triangle strip, the X, Y, Z, R, G and B values are copied from the register file addresses indicated by the Current Pointer to the corresponding addresses in the primitive RAM using the LSB'SForStrips in step 1186. The perspective value (W=1) is also written to the primitive RAM in step 1186. If the primitive is determined in step 1184 not to be part of a triangle strip, (and therefore part of a polyline), the X, Y, Z, R, G and B values are copied from the register file addresses indicated by the Last Pointer to the corresponding primitive RAM addresses using the LSB'SForStrips (Step 1188). In steps 1186 and 1188, the primitive RAM address for the Y coordinate is given by [tlis Y address, LSB'SForStrips]. The corresponding primitive RAM addresses are generated for each of the parameters. The perspective value (W=1) is also written to the primitive RAM in step 1188. Following step 1182, 1186 or 1188, X, Y, Z, R, G and B values are copied from the vertex RAM to the register file in step 1190. The X coordinate vertex address is given by [vertex X address, vertex read address LSB'S], where the vertex read address LSB'S are determined in step 1116, 1132 or 1152. Corresponding vertex RAM addresses are generated for the other parameters. The parameter values are copied to the locations in the register file indicated by the Current Pointer. The perspective value (W=1) is also written to the primitive RAM in step 1190. In step 1192, the process checks to determine if there are more vertices to be calculated for the primitive.

When the parameters are determined in step 1170 (FIG. 19D) not to be in device coordinates, perspective is enabled, as determined in 1172, and the primitive is not part of a polyline or a triangle strip, as determined in step 1210 (FIG. 19F), the red, green and blue values are copied from the register file locations indicated by the Last Pointer to the primitive RAM address locations indicated by the LSB'SForNormalCopies in step 1212. Step 1212 is the same as step 1182 described above. When the primitive is determined to be part of a triangle strip, as determined in step 1214, the X, Y, Z, R, G and B values are copied from the register file addresses indicated by the Current Pointer to the primitive RAM addresses indicated by the LSB'SForStrips in step 1216. Step 1216 corresponds to step 1186, except that the perspective value W is copied from the register file address indicated by the Current Pointer to the primitive RAM address indicated by the LSB'SForStrips. When the primitive is determined in step 1214 not to be part of a triangle strip (and thus part of a polyline), the X, Y, Z, R, G and B values are copied from the register file addresses indicated by the Last Pointer to the primitive RAM addresses indicated by the LSB'SForStrips in step 1218. Step 1218 corresponds to step 1188, except that the perspective value W is copied from the register file address indicated by the Last Pointer to the primitive RAM address indicated by LSB'SForStrips. In step 1220, X, Y and Z coordinates are read from the locations in the vertex RAM indicated by the vertex read address LSB'S. Then, the transformed values of X, Y and Z are calculated, and W is calculated. The transformed values and the value of W are written to the register file addresses indicated by the Current Pointer and to the primitive RAM addresses indicated by the tlisLSB'S. Finally in step 1220, the red, green and blue values are copied from the vertex RAM addresses indicated by the vertex read address LSB'S to the register file addresses indicated by the Current Pointer. In step 1222, the process checks to determine if there are more vertices to be calculated for the primitive.

When perspective is not enabled, as determined in step 1172, step 1230 (FIG. 19G) determines whether the primitive is part of a polyline or triangle strip. When the primitive is not part of a primitive or triangle strip, the R, G and B values are copied from the register file addresses indicated by the Last Pointer to the primitive RAM addresses indicated by the LSB'SForNormalCopies in step 1232. When the primitive is part of a triangle strip, as determined in step 1234, the X, Y, Z, R, G and B values are copied from the register file addresses indicated by the Current Pointer to the primitive RAM addresses indicated by the LSB'SForStrips, and the perspective value (W=1) is written to the corresponding primitive RAM address in step 1236. When the primitive is not part of a triangle strip (and thus part of a polyline), as determined in step 1234, the X, Y, Z, R, G and B values are copied from the register file addresses indicated by the Last Pointer to the primitive RAM addresses indicated by the LSB'SForStrips, and the perspective value (W=1) is written to the corresponding location in the primitive RAM in step 1238. Steps 1232, 1236 and 1238 correspond to steps 1182, 1186 and 1188, respectively. In step 1240, the X, Y and Z values are read from the vertex RAM locations indicated by the vertex read address LSB's, and transformed values of X, Y and Z are calculated. The transformed values of X, Y and Z are written to the register file addresses indicated by the Current Pointer and to the primitive RAM addresses indicated by the tlisLSB's. The perspective value (W=1) is written to the register file and to the primitive RAM. Red, green and blue values are copied from the vertex RAM address indicated by the vertex read address LSB's to the register file addresses indicated by the Current Pointer. The operations of step 1240 are the same as those of step 1220, except that no perspective calculations are performed. In step 1242, the process checks to determine if there are more vertices to be calculated for the primitive.

If all vertices have been processed, as determined in step 1250 (FIG. 19H), the ping-pong pointer is toggled in step 1252 and the process waits for the next primitive in step 1254. When all vertices have not been processed, dirty bit 1 is tested in step 1256. When dirty bit 1 is set, the vertex read address LSB's are set to 01 in step 1258. If the primitive is a vector and vertex 1 is the starting vertex, as determined in step 1260, the primitive RAM LSB's are set to 00 in step 1262. When the primitive is not a vector or vertex 1 of the vector is not the starting vertex, the primitive RAM LSB's are set to 01 in step 1264. Then the ping-pong pointer is toggled in step 1266. When dirty bit 2 is not set, as determined in step 1256, and the dirty bit 2 is set, as determined in step 1270, the vertex read address LSB's are set to 10 in step 1272. When the primitive is a vector, as determined in step 1274, and vertex 2 is the starting vertex, as determined in step 1276, the primitive RAM LSB's are set to 00 in step 1278. When vertex 2 is not the starting vector vertex, the primitive RAM LSB's are set to 01 in step 1280. When the primitive is not a vector, as determined in step 1274, the primitive RAM LSB's are set to 10 in step 1282. Then the ping-pong pointer is toggled in step 1266. When dirty bit 2 is not set, as determined in step 1270, the vertex read address LSB's are set to 11 in step 1284. When the primitive is determined to be a vector in step 1286, and vertex 3 is the starting vertex, as determined in step 1288, the primitive RAM LSB's are set to 00 in step 1290. When vertex 3 is not the starting vector vertex, the primitive RAM LSB's are set to 01 in step 1292. When the primitive is not a vector, as determined in step 1286, the primitive RAM LSB's are set to 11 in step 1294. The ping-pong pointer is then toggled in step 1266. After the ping-pong pointer is toggled, step 1296 determines whether the parameters are in device coordinates, and step 1298 determines whether perspective is enabled. When the parameters are in device coordinates, the process proceeds to step 1180 shown in FIG. 19E. When the parameters are not in device coordinates and perspective is enabled, the process proceeds to step 1210 shown in FIG. 19F. When the parameters are not in device coordinates and perspective is not enabled, the process proceeds to step 1230 shown in FIG. 19G.

Figure 20:
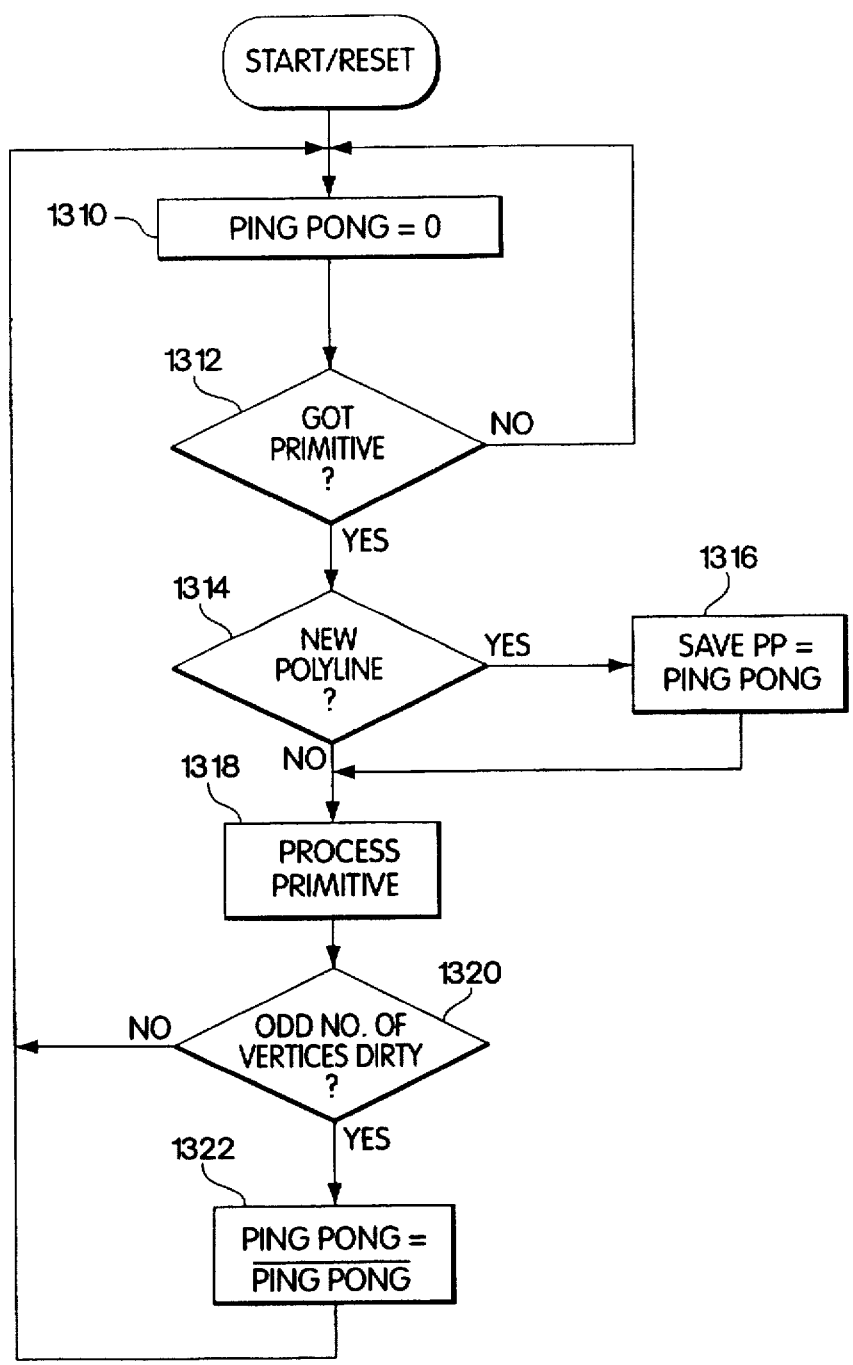
FIG. 20 shows a flow diagram of a process for controlling a ping-pong pointer during decomposition operations.

The addressing of the vertex RAM buffers 102 and 104, the register file 114 and the primitive RAM buffers 132 and 134 by the decomposition engine is now described. The dirty bits used to indicate which vertices require calculation has been described above. The decomposition engine utilizes its own Current and Last Pointers to control addressing of the register file in a manner similar to the transformation engine. The operation of the ping-pong pointer for the decomposition engine is shown in FIG. 20. The ping-pong pointer is reset in step 1310 prior to processing of vertex data. When vertex data for a primitive is available to the decomposition engine, as determined in step 1312, and the primitive is a new polyline, as determined in step 1314, a Save PP bit is set equal to the ping-pong pointer in step 1316. The primitive is processed by the decomposition engine in step 1318 as described above. If an odd number of vertices have dirty bits set, as determined in step 1320, the ping-pong pointer state is switched in step 1322. Otherwise, the ping-pong pointer is left in its present state and the process waits for additional primitive data.

Figure 21:
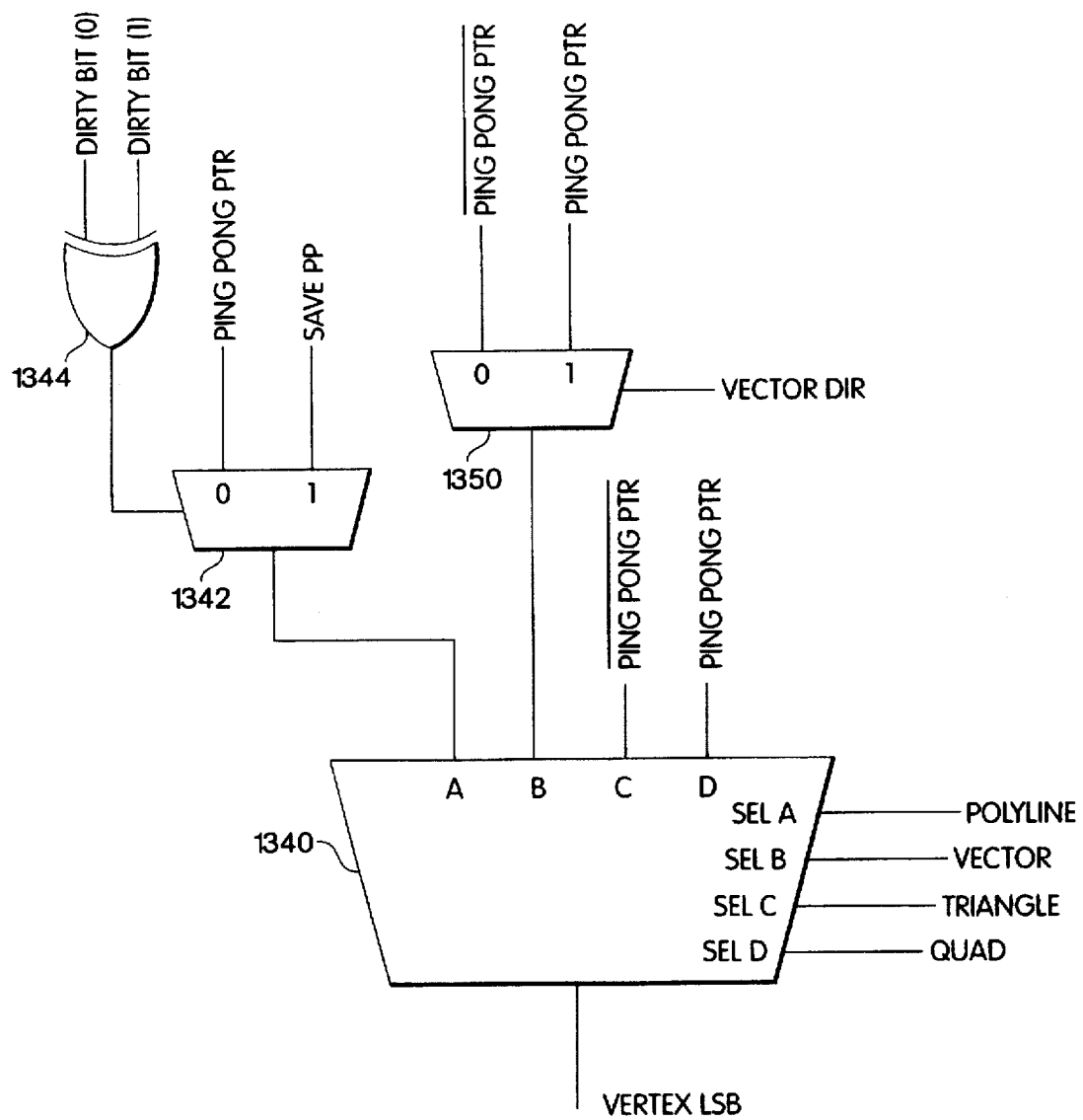
FIG. 21 is a schematic block diagram of logic for generating a vertex LSB that is used for addressing the register file.

Logic for generating a vertex LSB for addressing vertex information in the register file 114 is shown in FIG. 21. A multiplexer 1340 selects A, B, C or D inputs based on polyline, vector, triangle or quad signals respectively applied to select lines of the multiplexer. The polyline, vector, triangle and quad signals are representative of the primitive type being processed. The vertex LSB for polylines is supplied by a multiplexer 1342 which receives the ping-pong pointer at a first input and the Save PP bit at a second input. The ping-pong pointer and the Save PP bits are shown in FIG. 20 and described above. The select input of the multiplexer 1342 is controlled by an exclusive OR gate 1344, which receives dirty bit 0 and dirty bit 1 (see FIG. 18). The vertex LSB for vectors is generated by a multiplexer 1350 which receives the ping-pong pointer on a first input and the ping-pong pointer inverted on a second input. The select input of multiplexer 1350 is controlled by the vector direction bit shown in FIG. 18 and described above. The vertex LSB for triangles is the inverted ping-pong pointer, and the vertex LSB for quads is the ping-pong pointer.

Figure 22:
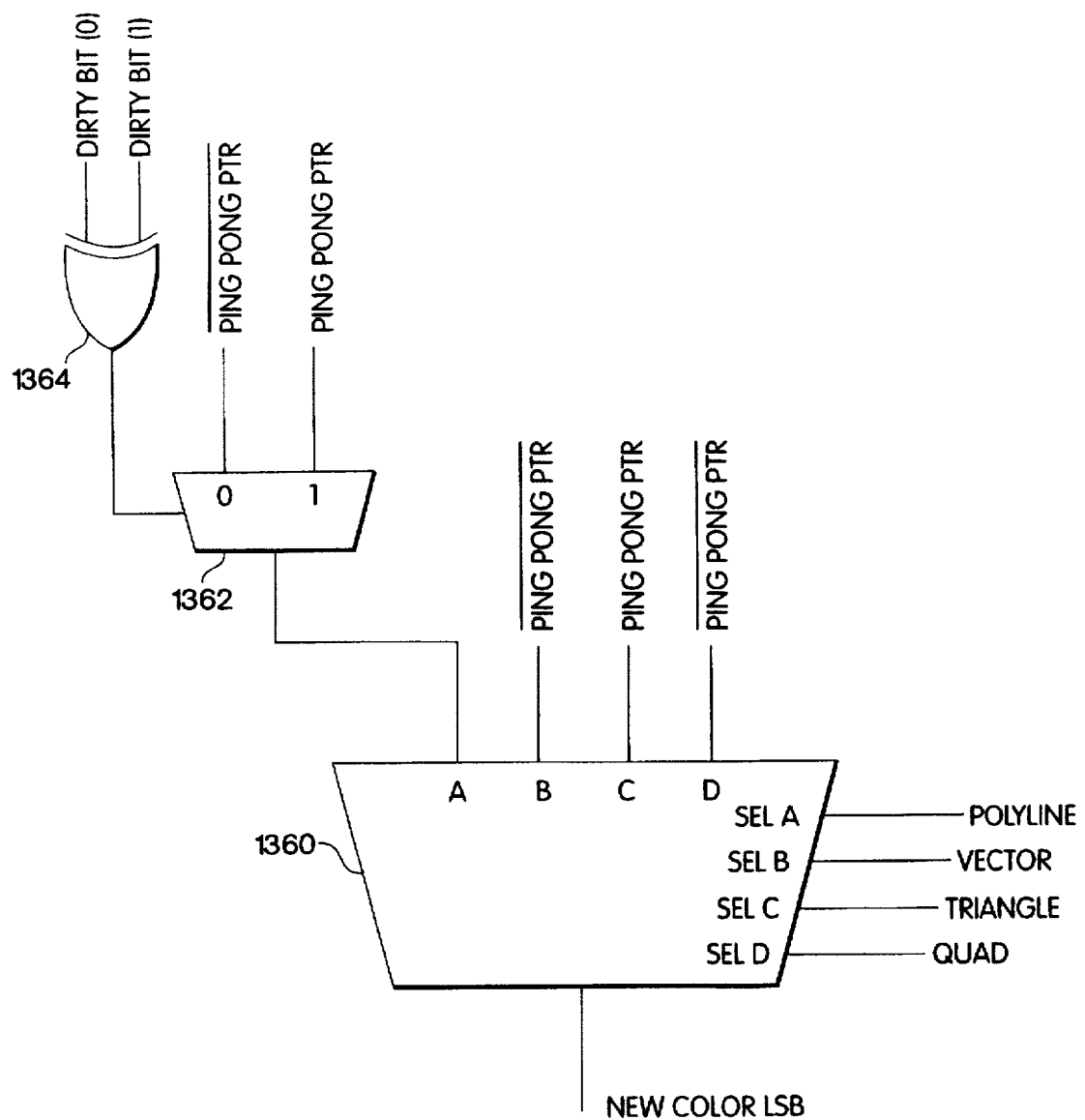
FIG. 22 is a schematic block diagram of logic for generating a new color LSB that is used for addressing the register file.

Logic for generation of a new color LSB is shown in FIG. 22. The new color LSB is part of the register file address and is used for copying the color values of the last vertex from the register file to the primitive RAM. A multiplexer 1360 selects A, B, C or D inputs based on polyline, vector, triangle or quad select inputs, respectively. The new color LSB for polylines is supplied by a multiplexer 1362 which receives the ping-pong pointer at a first input and the ping-pong pointer inverted at a second input. The select line of the multiplexer 1362 is controlled by an exclusive OR gate 1364which receives dirty bit 0 and dirty bit 1 at its inputs. The new color LSB for vectors and quads is the ping-pong pointer inverted, and the new color LSB for triangles is the ping-pong pointer.

Figure 23:
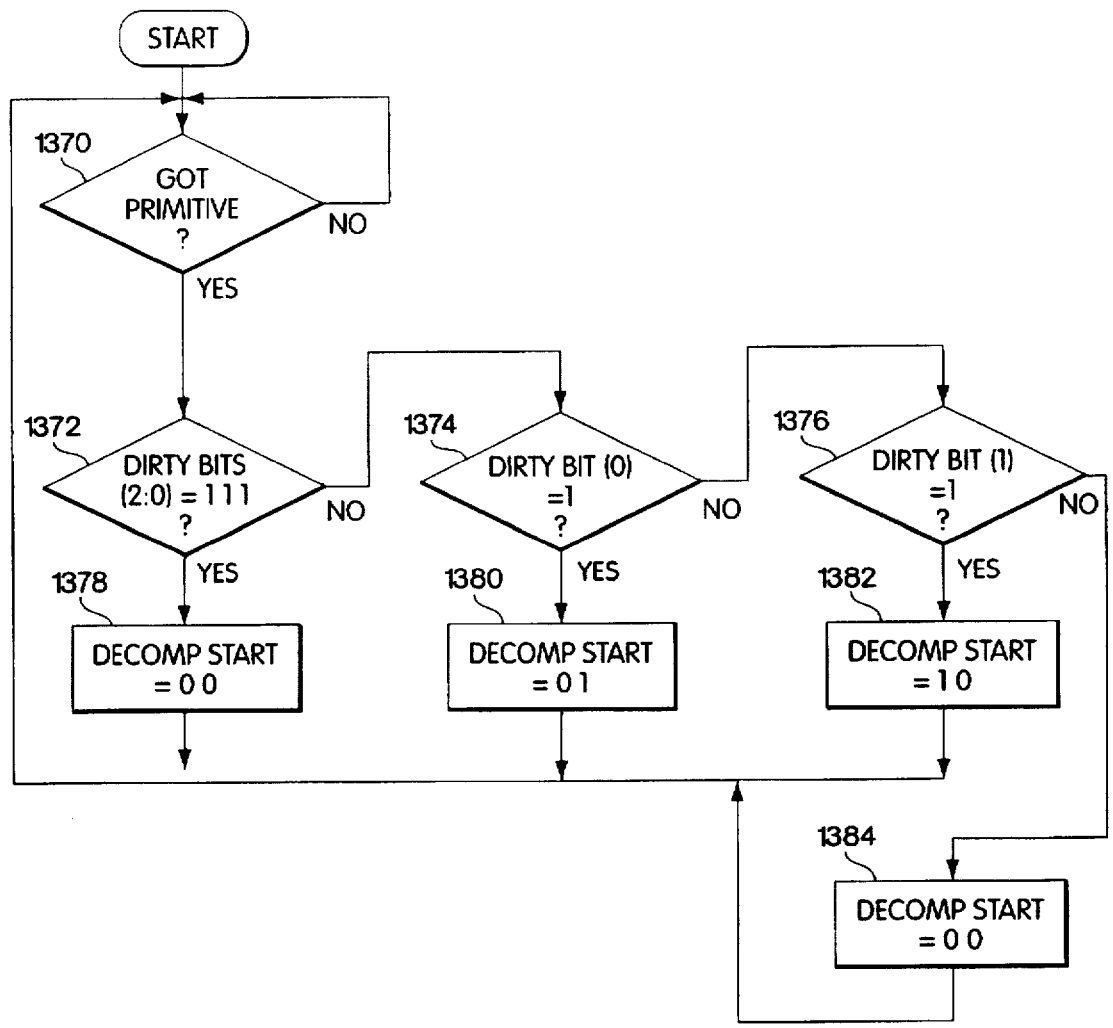
FIG. 23 shows a flow diagram of a process for generating decomp start bits for addressing the primitive RAM during decomposition operations.

A process for determining decomp start bits is shown in FIG. 23. The decomp start bits are used for determining the vertex data to be processed in the decomposition operations. The decomp start bits point to vertex data in the primitive RAM and identify the unshared vertex for triangle strips or vertex 0 for independent triangles and quadrilaterals. When primitive data is received by the decomposition engine, as determined in step 1370, the dirty bits are tested in steps 1372, 1374 and 1376. When dirty bits 0, 1 and 2 are all set, indicative of an independent triangle or quadrilateral, the decomp start bits are set to 00 in step 1378. When dirty bit 2 is set, as determined in step 1374, the decomp start bits are set to 01 in step 1380. When dirty bit 1 is set, as determined in step 1376, the decomp start bits are set to 10 in step 1382. Otherwise, the decomp start bits are set to 00 in step 1384.

Figure 24:
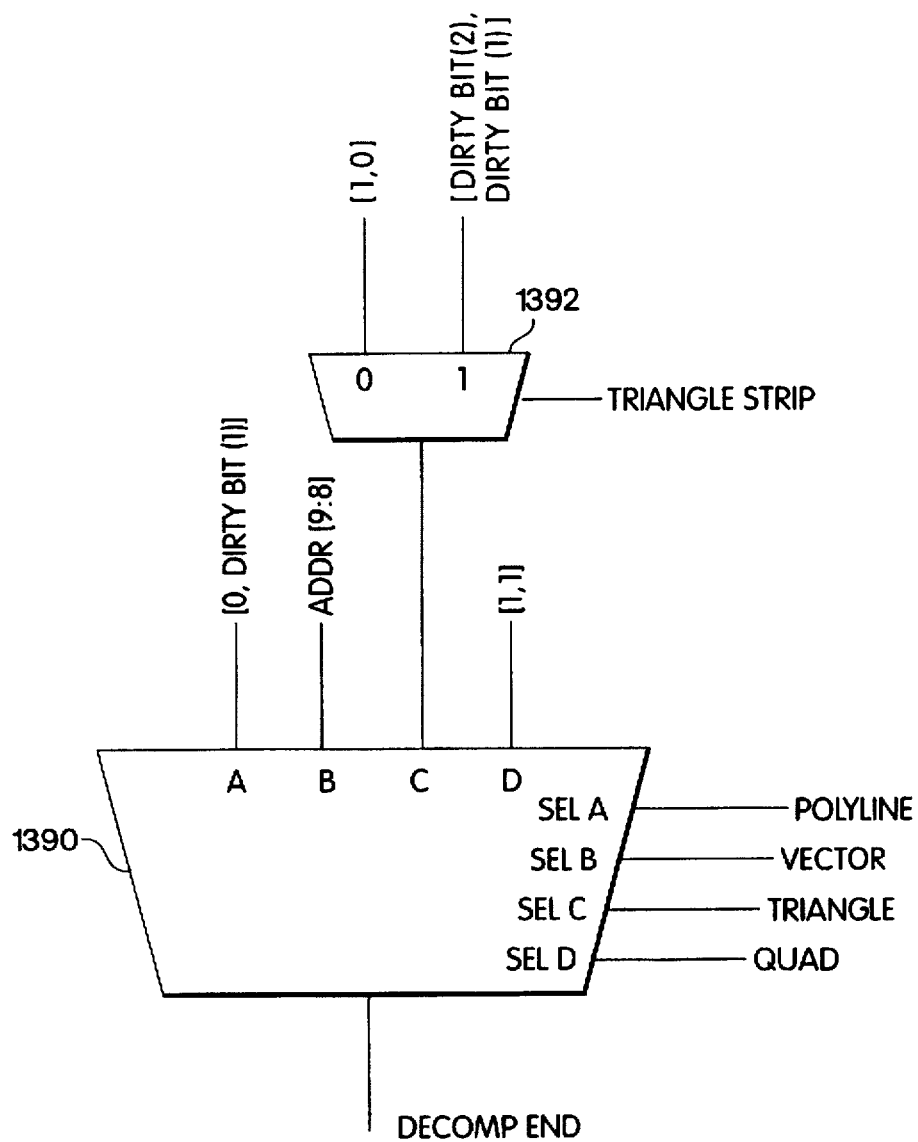
FIG. 24 is a schematic block diagram of logic for generating decomp end bits for addressing the last vertex written for a primitive in the primitive RAM.

Logic for determining decomp end bits is shown in FIG. 24. The decomp end bits point to the last vertex data written for the primitive in the primitive RAM. A multiplexer 1390 receives polyline, vector, triangle and quad select inputs. The decomp end bits for polylines are 0 and dirty bit 1. The decomp end bits for vectors are address bits 9 and 8. The decomp end bits for triangles are supplied by a multiplexer 1392 which receives 10 at a first input and dirty bits 2 and 1 at a second input. A triangle strip signal is supplied to the select input of multiplexer 1392. The decomp end bits for quads are 11.

In general, the decomposition engine computes slopes of new edges of primitives as described above. Simultaneously, the shared edge data or shared vertex data is copied from the register file 114 to the primitive RAM buffers 132 and 134 using the addressing scheme described above. Parameters values not involved in the calculations, including colors R,G,B and alpha, normals NX, NY and NZ and texture values S and T, are copied from the register file to the primitive RAM buffers when spare cycles are available.

The circuitry shown and described herein is given by way of example only. The circuitry is preferably implemented in a large scale custom integrated circuit using logic synthesis software that is commercially available, for example, from Synopsys. The logic synthesis software optimizes and translates circuit descriptions written in high level languages, such as Verilog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

While there have been shown and described what are at present considered the preferred embodiments of the present invention, it will be obvious to those skilled in the art that various changes and modifications may be made therein without departing from the scope of the invention as defined by the appended claims.

What is claimed is:

1. In a computer graphics system, apparatus for transfer of vertex information representative of graphics primitives between a host computer and processing circuitry, comprising:

a storage device for receiving said vertex information from the host computer, said vertex information including vertex data and a vertex address corresponding to said vertex data, wherein said vertex address specifies a characteristic of said corresponding vertex data;

a vertex RAM for storage of said vertex data for access by said processing circuitry;

address mapping logic for mapping said vertex address to a write address in said vertex RAM in accordance with the characteristic specified by said vertex address; and means for transferring said vertex data from said storage device to a location in said vertex RAM specified by said write address.

2. Apparatus for transfer of vertex information as defined in claim 1 wherein said vertex RAM comprises a first buffer and a second buffer and wherein said apparatus further comprises a read/write control circuit for enabling one of said first and second buffers for writing vertex data representative of successive primitives in said first and second buffers.

3. Apparatus for transfer of vertex information as defined in claim 2 wherein said vertex address specifies a vector draw vertex address indicative of a new vertex of a polyline primitive, wherein said address mapping logic includes means for mapping successive vector draw vertex addresses in alternating first and second vertex locations in said vertex RAM and wherein said read/write control circuit includes means for enabling the least recently written of said first and second buffers for writing vertex data corresponding to successive vector draw vertex addresses.

4. Apparatus for transfer of vertex information as defined in claim 2 wherein said vertex address specifies a vector strip vertex address indicative of a new vertex of a triangle strip, wherein said address mapping logic includes means for mapping successive vector strip vertex addresses in sequence to first, second and third vertex locations in said vertex RAM and wherein said read/write control circuit includes means for enabling the least recently written of said first and second buffers for writing vertex data corresponding to successive vector strip vertex addresses.

5. Apparatus for transfer of vertex information as defined in claim 1 wherein said vertex address specifies a trigger primitive command and wherein said apparatus further includes means responsive to said trigger primitive command for notifying said processing circuitry to begin processing said vertex data.

6. Apparatus for transfer of vertex information as defined in claim 1 wherein said vertex address specifies a double word write and wherein said address mapping logic includes means responsive to said double word write for mapping successive vertex data words following said double word write to successive locations of said vertex RAM.

7. Apparatus for transfer of vertex information as defined in claim 1 wherein said storage device comprises a first-in first-out buffer register.

8. Apparatus for transfer of vertex information as defined in claim 1 wherein said vertex address specifies a vertex number of a primitive and wherein said address mapping logic includes means responsive to said vertex number for mapping said vertex data to a write address in said vertex RAM that corresponds to said vertex number.

9. Apparatus for transfer of vertex information as defined in claim 1 wherein said vertex address specifies a vertex number of a primitive and a trigger primitive command, wherein said apparatus further comprises means responsive to said trigger primitive command for notifying said processing circuitry to begin processing of said vertex data and wherein said address mapping logic includes means responsive to said vertex number for mapping said vertex data to a write address in said vertex RAM that corresponds to said vertex number.

10. Apparatus for transfer of vertex information as defined in claim 1 wherein said vertex address specifies a double word write and a trigger primitive command, wherein said address mapping logic includes means responsive to said double word write for mapping successive vertex data words following said double word write to successive locations in said vertex RAM and wherein said apparatus further comprises means responsive to said trigger primitive command for notifying said processing circuitry to begin processing of said vertex data.

11. In a computer graphics system, a method for transfer of vertex information representative of graphics primitives between a host computer and graphics hardware comprising processing circuitry, a storage device and a vertex RAM, said method comprising the steps of:

transferring said vertex information from the host computer to said storage device, said vertex information including vertex data and a vertex address corresponding to said vertex data, wherein said vertex address specifies a characteristic of said corresponding vertex data;

mapping said vertex address to a write address in said vertex RAM in accordance with the characteristic specified by said vertex address; and transferring said vertex data from said storage device to a location in said vertex RAM specified by said write address.

12. A method for transfer of vertex information as defined in claim 11 wherein said vertex RAM comprises a first buffer and a second buffer and wherein said method further comprises enabling one of said first and second buffers for writing vertex data representative of successive primitives in said first and second buffers.

13. A method for transfer of vertex information as defined in claim 12 wherein said vertex address specifies a vector draw vertex address indicative of a new vertex of a polyline primitive, wherein the step of mapping includes mapping successive vector draw vertex addresses in alternating first and second vertex locations in said vertex RAM and wherein the step of enabling one of said first and second buffers includes enabling the least recently written of said first and second buffers for writing vertex data corresponding to successive vector draw vertex addresses.

14. A method for transfer of vertex information as defined in claim 12 wherein said vertex address specifies a vector strip vertex address indicative of a new vertex of a triangle strip, wherein the step of mapping includes mapping successive vector strip vertex addresses in sequence to first, second and third vertex locations in said vertex RAM and wherein the step of enabling one of said first and second buffers includes enabling the least recently written of said first and second buffers for writing vertex data corresponding to successive vector strip vertex addresses.

15. A method for transfer of vertex information as defined in claim 11 wherein said vertex address specifies a trigger primitive command and wherein said method further includes notifying said processing circuitry to begin processing said vertex data in response to said trigger primitive command.

16. A method for transfer of vertex information as defined in claim 11 wherein said vertex address specifies a double word write and wherein the step of mapping includes mapping successive vertex data words following said double word write to successive locations of said vertex RAM.

17. A method for transfer of vertex information as defined in claim 11 wherein said vertex address specifies a vertex number of a primitive and wherein the step of mapping includes mapping said vertex data to a write address in said vertex RAM that corresponds to said vertex number.

* * * * *